(12) United States Patent
Zhang et al.

(10) Patent No.: US 11,805,776 B2
(45) Date of Patent: Nov. 7, 2023

(54) COMPOSITIONS AND METHODS FOR KILLING INSECT AND NON-INSECT PESTS

(71) Applicant: The United States of America, as Represented by the Secretary of Agriculture, Washington, DC (US)

(72) Inventors: Aijun Zhang, Laurel, MD (US); Yan Feng, Bowie, MD (US); Jian Chen, Greenville, MS (US)

(73) Assignee: The United States of America, as Represented by the Secretary of Agriculture, Washington, DC (US)

( * ) Notice: Subject to any disclaimer, the term of this patent is extended or adjusted under 35 U.S.C. 154(b) by 246 days.

(21) Appl. No.: 16/227,192

(22) Filed: Dec. 20, 2018

(65) Prior Publication Data
US 2019/0216084 A1    Jul. 18, 2019

Related U.S. Application Data

(60) Provisional application No. 62/617,718, filed on Jan. 16, 2018.

(51) Int. Cl.
*A01N 37/10* (2006.01)
*A01N 37/40* (2006.01)
*A01N 25/02* (2006.01)

(52) U.S. Cl.
CPC ............. *A01N 37/10* (2013.01); *A01N 25/02* (2013.01); *A01N 37/40* (2013.01)

(58) Field of Classification Search
CPC ......... A01N 25/02; A01N 37/10; A01N 37/40
USPC ........................................................ 514/537
See application file for complete search history.

(56) References Cited

U.S. PATENT DOCUMENTS

| | | | | |
|---|---|---|---|---|
| 2,245,131 A * | 6/1941 | Herrmann et al. | ..... | C07C 67/10 526/330 |
| 3,149,087 A * | 9/1964 | Anagnostopoulos | ... | C08L 27/06 525/169 |
| 4,062,855 A * | 12/1977 | Allan | ...... | A01N 37/10 528/327 |
| 4,225,693 A * | 9/1980 | McCormick | .......... | A01N 25/10 424/419 |
| 6,635,663 B1 * | 10/2003 | Zen | ......... | A01N 25/02 514/345 |
| 8,394,358 B2 * | 3/2013 | Schneidmiller | ......... | A01N 65/44 424/43 |
| 9,629,362 B1 * | 4/2017 | Zhang | ..................... | A01N 37/10 |
| 9,693,557 B2 * | 7/2017 | Zhang | ..................... | A01N 45/02 |
| 10,092,004 B2 * | 10/2018 | Raman | ..................... | A01N 25/06 |
| 10,098,344 B2 * | 10/2018 | Raman | .................. | A01N 25/06 |
| 2011/0124505 A1 * | 5/2011 | Merlet | ................... | A01N 25/02 504/206 |
| 2011/0190129 A1 * | 8/2011 | Bell | ...................... | A01N 25/02 504/105 |
| 2016/0262375 A1 * | 9/2016 | Raman | ................... | A01N 57/20 |
| 2018/0179140 A1 * | 6/2018 | Marras | ................ | B01J 35/0006 |

FOREIGN PATENT DOCUMENTS

| | | |
|---|---|---|
| CN | 107439614 A | 12/2017 |
| WO | 139805 A1 | 2/2014 |
| WO | 136544 A1 | 8/2017 |

OTHER PUBLICATIONS

Yumiko Noguchi et al. (STN Search, AN: 2016:1622237; HCAPLUS; DN 165:472392, WO 2016159214 A1, Mar. 31, 2016, Title: Combination of harmful-arthropod attracting compound and harmful-arthropod repelling compound for pest control system).*
NCBI (National Center for Biotechnology Information (2004). PubChem Bioassay Record for AID 248, Source: DTP/NCI. https://pubchem.ncbi.nlm.nih.gov/bioassay/248). (Year: 2004).*
Datatable (AID_248_datatable_all (available 2004)). (Year: 2004).*
Bhargava, P. M. et al. "Search for Insecticides : Chemical Constitution and Insecticidal Activity," J.S.F.A., Jun. 1950, 178-182.
International Searching Authority, PCT/US2019/012850 for The United States of America, as Represented by the Secretary of Agriculture , International Filing Date Jan. 9, 2019.

* cited by examiner

*Primary Examiner* — Jeffrey S Lundgren
*Assistant Examiner* — Chris E Simmons
(74) *Attorney, Agent, or Firm* — John Fado; John Henri

(57) ABSTRACT

Compositions for killing insects (the term "insects" as used herein includes non-insects such as ticks, mites, spiders, centipedes, scorpions, chiggers, and solifugids), said composition containing at least one compound of formula 1

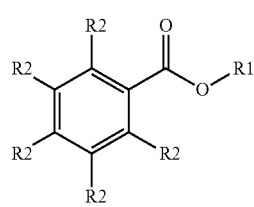

wherein R1 is $CH_3$, $C_2H_5$, $C_3H_7$; saturated or unsaturated, straight or branched, or halogen substituted alkyl; and wherein R2 are independently H, halogen, nitrogen, oxygen, sulfur, saturated or unsaturated, straight or branched alkyl, alkenyl, alkyl halide, aldehyde, ketone, ether, ester, amine, or amide; optionally methyl benzoate, optionally a surfactant, and optionally a carrier. Also disclosed are methods for killing insects, involving treating an object or area with an insect killing effective amount of the compositions, optionally methyl benzoate, optionally a surfactant, and optionally a carrier.

2 Claims, 8 Drawing Sheets

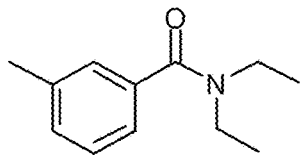

N,N-diethyl-3-methylbenzamide (Deet)

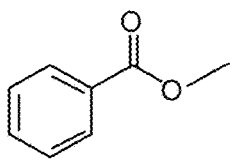 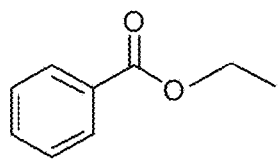 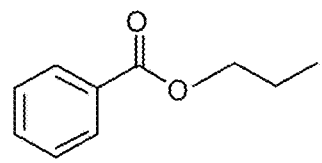

Methyl benzoate (MB)*     Ethyl benzoate (EB)*     n-Propyl benzoate (nPrB)*

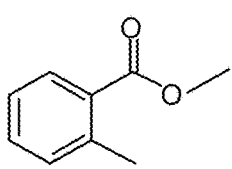 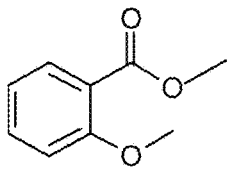 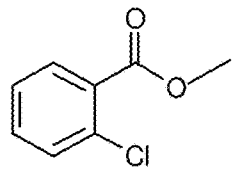

Methyl 2-methylbenzoate (M2MB)*    Methyl 2-methoxybenzoate (M2MOB)*    Methyl 2-chlorobenzoate (M2CB)

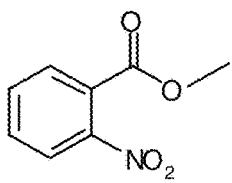 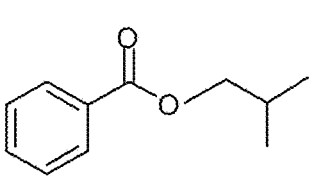 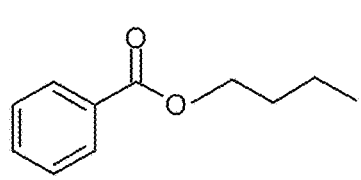

Methyl 2-nitrobenzoate (M2NB)     iso-Butyl benzoate (iBB)*     n-Butyl benzoate (nBB)*

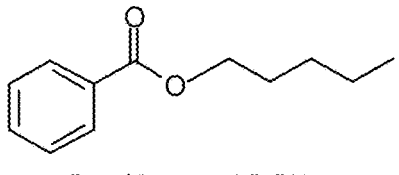 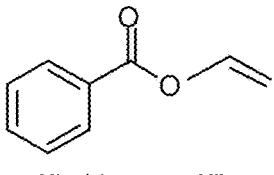 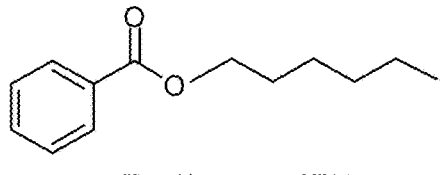

n-Pentyl benzoate (nPeB)*     Vinyl benzoate (VB)     n-Hexyl benzoate (nHB)*

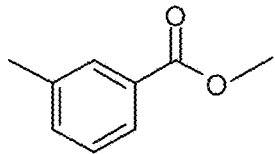 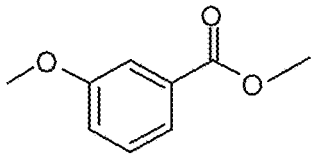 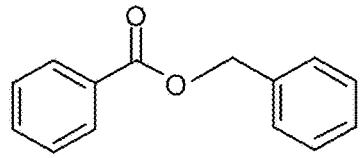

Methyl 3-methylbenzoate (M3MB)    Methyl 3-methoxybenzoate (M3MOB)    Benzyl benzoate (BB)*

COMPOSITIONS AND METHODS FOR KILLING INSECT AND NON-INSECT PESTS

REFERENCE TO RELATED APPLICATION

This application claims the benefit of U.S. Provisional Application No. 62/617,718, filed 16 Jan. 2018, which is incorporated herein by reference in its entirety.

BACKGROUND OF THE INVENTION

Disclosed herein are compositions for killing insects (the term "insects" as used herein includes non-insects such as ticks, mites, spiders, centipedes, scorpions, chiggers, and solifugids), said composition containing at least one compound of formula 1

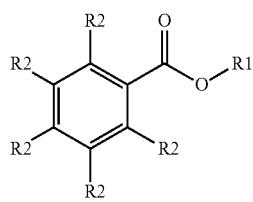

wherein R1 is $CH_3$, $C_2H_5$, $C_3H_7$; saturated or unsaturated, straight or branched, or halogen substituted alkyl; and wherein R2 are independently H, halogen, nitrogen, oxygen, sulfur, saturated or unsaturated, straight or branched alkyl, alkenyl, alkyl halide, aldehyde, ketone, ether, ester, amine, or amide; optionally methyl benzoate, optionally a surfactant, and optionally a carrier.

Also disclosed are methods for killing insects, involving treating an object or area with an insect killing effective amount of the compositions, optionally methyl benzoate, optionally a surfactant, and optionally a carrier.

The world is facing unprecedented challenges in agriculture, with higher demands for food supplies and ever-increasing concerns about human health, food safety, and environmental sustainability (Garnett, T., Proc. Nuri. Soc., 72: 29-39 (2013); van der Werf, H. M. G., et al., J. Cleaner Prod., 73: 1-9 (2014)). Pesticides are substances that control insect pests. After the use of synthetic pesticides, human populations achieved enormous growth (Enserink, M., et al., Science, 341: 729 (2013)), and pesticides provided means to help people avoid malaria and other insect-borne diseases (Rose, R. I., Emerging Infect. Dis., 7: 17-23 (2001)). However, pesticides also posed great threats to human health and the environment. The current use of pesticides is ubiquitous. In the U.S., 80% of pesticides are used in agriculture and the remaining 20% are used in the non-agricultural sector (Stokstad, E., and G. Grullon, Science, 341: 730-731 (2013)). Overuse of pesticides has become a big problem since pesticides are also harmful for species diversity and the environment (Mascarelli, A., Science, 341: 740-741 (2013)). There are 42% fewer species of invertebrates in streams with severe pesticide contamination (Stokstad and Grullon 2013). Many studies have been done but the ecosystem-wide impacts of pesticides are still in need of more research (Kohler, H. R., and R. Triebskorn, Science, 341: 759-765 (2013)). Completely abandoning pesticides is not possible, at least in the near future, so it is highly desired to develop environmentally benign but effective alternatives to the widely used toxic synthetic pesticides.

Plant toxins that occur in the nature are believed to be more desirable insecticides than conventional synthetic insecticides due to their rapid environmental biodegradability and potential lower toxicity to pollinators (e.g., bees; methyl benzoate has been found to be produced by adult bees as alarm pheromone component (Carroll, M. J., and A. J. Duehl, Apidologie, 43: 715-730 (2012)) and natural enemies (e.g., predators and parasitoids such as green lacewing, Chrysopa cameo (Stephens), Geocoris spp., Trichogramma spp. (Williams, T., et al., Biocontrol Sci. Technol., 13: 459-475 (2003); Theiling, K. M., and B. A. Croft, Agriculture Ecosystems & Environment, 21: 191-218 (1988)), humans and other mammals (Copping, L. G., and S. O. Duke, Pest Manage. Sci., 63: 524-554 (2007)). Therefore, there has been more and more interest in green pesticides in recent years. Naturally occurring products, such as essential oils, have great potential to be alternatives to the toxic synthetic pesticides (Isman, M. B., Annu. Rev. Entomol., 51: 45-66 (2006); Adorjan, B., and G. Buchbauer, Flavour Fragrance J., 25: 407-426 (2010); Sivakumar, D., and S. Bautista-Banos, Crop Protect., 64: 27-37 (2014)). The essential oils based green pesticides have many attractive properties (Tehri, K., and N. Singh, Int. J. Mosq. Res., 2: 18-23 (2015); Pavela, R., Industrial Crops and Products, 76: 174-187 (2015)). Usually they are safe for human beings and benign to the environment. They often exhibit pesticidal activities to a broad spectrum of insects and sometimes, due to the complex chemical components, they have synergistic effects (Mossa, A. T. H., J. Environ. Sci. Technol., 9: 354-378 (2016)). Because of their volatility in nature, essential oils are also very important fumigants against agricultural and food storage insects (Mossa 2016).

We have previously reported (see U.S. Pat. No. 9,629,362 which is incorporated by reference in its entirety) that a volatile organic compound (VOC) component, methyl benzoate (MB) identified from fermented apple juice, exhibited significant toxicity or sublethal effect against some insect pests, including invasive fruit-infesting fly, spotted wing drosophila Drosophila suzukii Matsumura, brown marmorated stinkbug Halyomorpha halys, diamondback moth Plutella xylostella, and tobacco hornworm Manduca sexta (Feng, Y., and A. Zhang, Sci. Rep., 7: 42168 (2017)). However, it is desirable to produce other green pesticides in order to reduce the use of widely used toxic synthetic pesticides.

SUMMARY OF THE INVENTION

Disclosed herein are compositions for killing insects (the term "insects" as used herein includes non-insects such as ticks, mites, spiders, centipedes, scorpions, chiggers, and solifugids), said composition containing at least one compound of formula 1

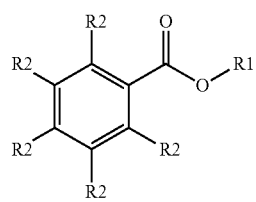

wherein R1 is $CH_3$, $C_2H_5$, $C_3H_7$; saturated or unsaturated, straight or branched, or halogen substituted alkyl; and wherein R2 are independently H, halogen, nitrogen, oxygen, sulfur, saturated or unsaturated, straight or branched alkyl, alkenyl, alkyl halide, aldehyde, ketone, ether, ester, amine, or amide; optionally methyl benzoate, optionally a surfactant, and optionally a carrier.

Also disclosed are methods for killing insects, involving treating an object or area with an insect killing effective amount of the compositions, optionally methyl benzoate, optionally a surfactant, and optionally a carrier.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

BRIEF DESCRIPTION OF THE DRAWINGS

FIG. 1 shows the chemical structures of DEET, methyl benzoate, and other compounds tested in this study as described below. Compounds with an * are naturally occurring compounds. All of the compounds listed are commercially available.

FIG. 5 shows correlation between contact toxicities (LD50 values) and alkyl chain length of alcohols in benzoates at a dose of 77.9 µg/ant as described below.

FIG. 6 shows mean mortalities (%) of *S. invicta* workers at 24 h after being fumigated with MB and other compounds at a dose of 1.43 µg/mL as described below. Means followed by the different letters are significantly different at a=0.05.

FIG. 7 shows correlation between fumigant toxicities of alkyl benzoates and alkyl chain length of alcohols in benzoates at the dosage of 1.43 µg/mL as described below.

DETAILED DESCRIPTION OF THE INVENTION

Figure 2:
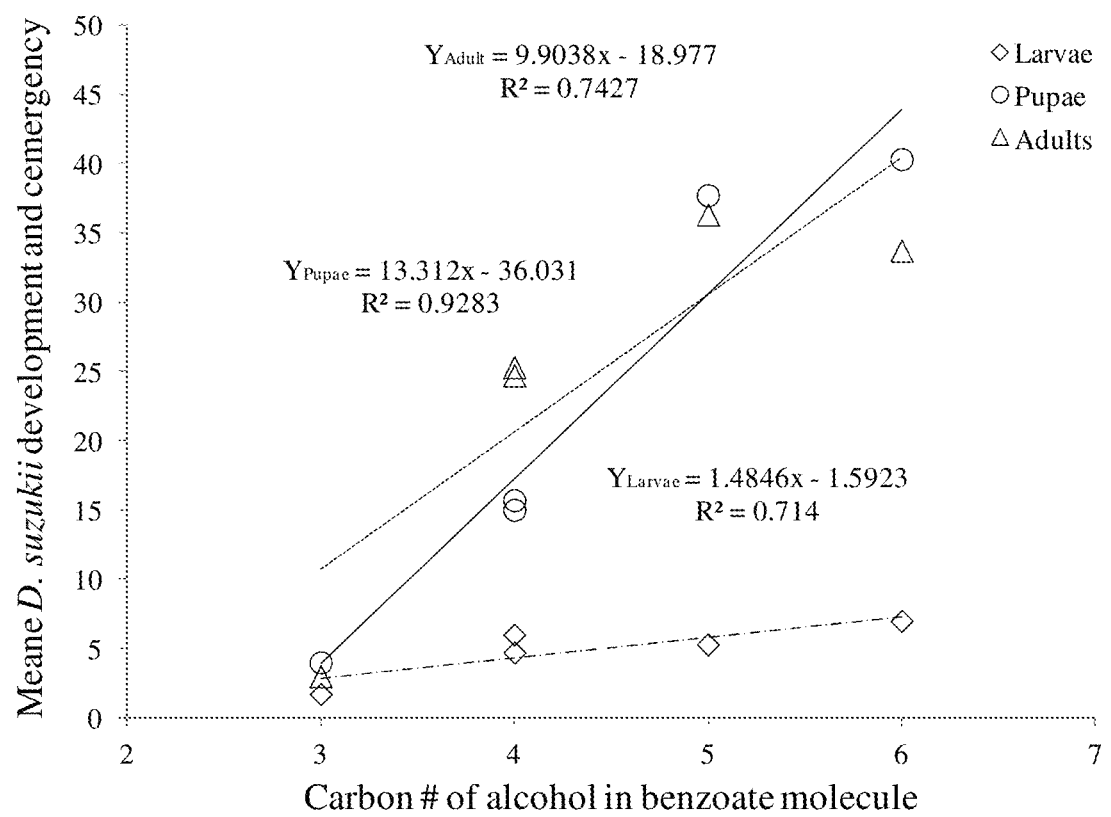
FIG. 2 shows the correlation between toxicities and alkyl chain length of alcohols in benzoates as described below.

Disclosed herein are compositions which contain at least one compound of the formula 1

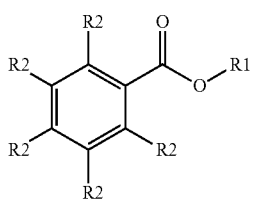

wherein R1 is $CH_3$, $C_2H_5$, $C_3H_7$; saturated or unsaturated, straight or branched, or substituted short chain alkyl (e.g., C1 to C10, preferably C1 to C6; e.g., vinyl, isopropyl, pentyl; alkyl substituted with a halogen such as fluoromethyl, 3-chloropentyl); and wherein R2 are independently H, halogen (e.g., F, Cl, Br, I; such as methyl 2-fluorobenzoate), nitrogen (e.g., methyl 2-nitrobenzoate), oxygen (e.g., methyl 2-methoxybenzoate), sulfur (e.g., methyl 2-methylthiobenzoate); saturated or unsaturated, straight or branched alkyl (e.g., C1 to C10, preferably C1 to C6; such as methyl 2-isobutylbenzoate), alkenyl (e.g., C1 to C10, preferably C1 to C6; such as methyl 2-isobutenylbenzoate), alkyl halides (e.g., C1 to C10, preferably C1 to C6; such as methyl 2-(2-chloroethyl)benzoate), aldehyde (e.g., C1 to C10, preferably C1 to C6; such as methyl 2-(2-oxoethyl)benzoate), ketone (e.g., C1 to C10, preferably C1 to C6; such as methyl 2-acetylbenzoate), ether (e.g., C1 to C10, preferably C1 to C6; such as methyl 2-(methoxymethyl)benzoate), ester (e.g., C1 to C10, preferably C1 to C6; such as methyl 2-[(acetyloxy)methyl]benzoate), amine (e.g., C1 to C10, preferably C1 to C6; such as methyl 2-aminobenzoate), or amide (e.g., C1 to C10, preferably C1 to C6; such as methyl 2-(aminocarbonyl)benzoate). More preferably R1 is methyl and R2 are hydrogens. All of these compounds can be made by a standard synthetic procedure called "Fischer esterification" utilizing corresponding benzoic acids, acid chlorides, or acid anhydrides and reacting with corresponding alcohols in the presence of an acid catalyst (Fischer, E., and A. Speier, "Darstellung der Ester", Chemische Berichte, 28: 3252-3258 (1895)).

Compositions containing one or more (e.g., two) of these compounds may contain one specific compound or may not contain that specific compound. For example, a composition could contain methyl 2-nitrobenzoate, or the composition may not contain methyl 2-nitrobenzoate. Another example, a composition could contain methyl 2-methylthiobenzoate and methyl 2-[(acetyloxy)methyl]benzoate), or the composition may not contain methyl 2-[(acetyloxy)methyl]benzoate).

Also disclosed herein are methods for killing insects (the term "insects" as used herein includes non-insects such as ticks, mites, spiders, centipedes, scorpions, chiggers, and solifugids) involving treating an object or area with an insect killing effective amount of a composition containing the compounds disclosed herein and optionally a carrier (e.g., agronomically or physiologically or pharmaceutically acceptable carrier). The carrier component can be a liquid or a solid material. The term "carrier" as used herein includes carrier materials such as those described below. As is known in the art, the vehicle or carrier to be used refers to a substrate such as a mineral oil, paraffin, silicon oil, water, membrane, sachets, disks, rope, vials, tubes, septa, resin, hollow fiber, microcapsule, cigarette filter, gel, fiber, natural and/or synthetic polymers, elastomers or the like. All of these substrates have been used to controlled release effective amount of a composition containing the compounds disclosed herein in general and are well known in the art. Suitable carriers are well-known in the art and are selected in accordance with the ultimate application of interest. Agronomically acceptable substances include aqueous solutions, glycols, alcohols, ketones, esters, hydrocarbons halogenated hydrocarbons, polyvinyl chloride; in addition, solid carriers such as clays, laminates, cellulosic and rubber matrices and synthetic polymer matrices, or the like.

The terms "object" or "area" as used herein include any place where the presence of target pests is not desirable, including any type of premises, which can be out-of-doors, such as in farms, orchards, parks, yards, gardens, lawns, tents, camping bed nets, camping areas, forests, and so forth, or indoors, such as in barns, garages, commercial buildings, homes, silos, grain storage, and so forth, or any area where pests are a problem, such as in shipping or storage containers (e.g., luggage, bags, boxes, crates, etc.), packing materials, bedding, and so forth; also includes clothing.

The amount of the compounds described herein or compositions described herein to be used will be at least an effective amount. The term "effective amount," as used herein, means the minimum amount of the compounds or compositions needed to kill the insects, ticks, mites, spiders, centipedes, scorpions, chiggers, and solifugids when compared to the same area or object which is untreated. Of course, the precise amount needed will vary in accordance with the particular composition used; the type of area or object to be treated; and the environment in which the area or object is located. The precise amount of the composition can easily be determined by one skilled in the art given the teaching of this application. For example, one skilled in the art could follow the procedures utilized below; the composition would be statistically significant in comparison to a negative control. The compounds described herein or compositions described herein to be used will be at least an effective amount of the compound or diluted solution of the compound; for fumigation the compounds used may have to be pure form (not mixed or adulterated with any other substance or material). Generally the concentration of the compounds will be, but not limited to, about 0.025% to about 10% (e.g., 0.025 to 10%, for example in an aqueous solution), preferably about 0.5% to about 4% (e.g., 0.5 to 4%), more preferably about 1% to about 2% (e.g., 1 to 2%). The composition may or may not contain a control agent for insects, such as a biological control agent or an insecticide known in the art to kill insects. Other compounds (e.g., insect attractants or other insecticides known in the art) may be added to the composition provided they do not substantially interfere with the intended activity and efficacy of the composition; whether or not a compound interferes with activity and/or efficacy can be determined, for example, by the procedures utilized below.

The compositions can therefore be used for killing insects such as harmful or troublesome blood-sucking, stinging and biting insects, ticks and mites. The term "insects" as used herein include all stages of insect life cycle: adults, larvae, nymphs, pupae, and eggs. The term "insects" as used herein includes non-insects such as ticks, mites, spiders, centipedes, scorpions, chiggers, and solifugids.

Agriculturally important insects (e.g., insects that are harmful to agricultural plants and/or products such as grains, cereals and stored foods) include spotted wing drosophila *Drosophila suzukii*, brown marmorated stinkbug *Halyomorpha halys*, emerald ash borer *Agrilus planipennis*, gypsy moth *Lymantria dispar dispar*, pink hibiscus mealybug *Maconellicoccus hirsutus*, Mediterranean fruit fly *Ceratitis capitata*, plum curculio *Conotrachelus nenuphar*, diamondback moth *Plutella xylostella*, soybean aphid *Aphis glycines*, cotton aphid *Aphis gossypii*, sugarcane aphid, *Melanaphis sacchari*, indianmeal moths *Plodia interpunctella*, bean weevils *Acanthoscelides obtectus*, mountain pine beetle *Dendroctonus ponderosae*, colorado potato beetle *Leptinotarsa decemlineata*, Asian citrus psyllid *Diaphorina citri Kuwayama*, light brown apple moth *Epiphyas postvittanaor*, earworm *Helicoverpa armigera*, potato white worm *Helicoverpa armigera*, western corn rootworm, *Diabrotica virgifera virgifera*, lygus species (e.g., *Lygus lineolaris*, *Lygus hesperus*, *Lygus rugulipennis*), spotted lanternfly, *Lycorma delicatula*, khapra beetle *Trogoderma granarium*, Indian meal moth, *Plodia interpunctella*, clothes moths, *Tinea* and *Tineola* species, cigarette beetle, *Lasioderma serricorne*, drugstore beetle, *Stegobium paniceum*, saw-toothed grain beetle, *Oryzaephilus surinamensis*, larder beetles *Dermestes lardarius*, mealworm beetle *Tenebrio molitor*, flour beetles (e.g. darkling beetle genera *Tribolium* or *Tenebrio*), carpet beetles (e.g. *Anthrenus verbasci*), bee louse *Braula coeca*, small hive beetle *Aethina tumida*, larval greater wax moth *Galleria mellonella*, and tobacco hornworm *Manduca sexta*.

Blood-sucking insects include mosquitoes (for example *Aedes*, *Culex* and *Anopheles* species), sand flies (for example *Phlebotomus* and *Lutzomyia* species such as *Phlebotomus papatasi*), owl gnats (*Phlebotoma*), blackfly (*Culicoides* species), buffalo gnats (*Simulium* species), biting flies (for example *Stomoxys calcitrans*), tsetse flies (*Glossina* species), horseflies (*Tabanus*, *Haematopota* and *Chrysops* species), house flies (for example *Musca domestica* and *Fannia canicularis*), meat flies (for example *Sarcophaga carnaria*), flies which cause myiasis (for example *Lucilia cuprina*, *Chrysomyia chloropyga*, *Hypoderma bovis*, *Hypoderma lineatum*, *Dermatobia hominis*, *Oestrus ovis*, *Gasterophilus intestinalis* and *Cochliomyia hominovorax*), bugs (for example *Cimex lectularius*, *Rhodnius prolixus* and *Triatoma infestans*), lice (for example *Pediculus humanus*, *Haematopinus suis* and *Damalina ovis*), louse flies (for example *Melaphagus orinus*), fleas (for example *Pulex irritans*, *Cthenocephalides canis* and *Xenopsylla cheopis*) and sand fleas (for example *Dermatophilus penetrans*).

Biting insects include cockroaches (for example *Blattella germanica*, *Periplaneta americana*, *Blatta orientalis* and *Supella supellectilium*), beetles (for example *Sitophilus granarius*, *Tenebrio molitor*, *Dermestes lardarius*, *Stegobium paniceum*, *Anobium puntactum* and *Hylotrupes bajulus*), termites (for example *Reticulitermes lucifugus*), bed bug (for example *Cimex lectularius*) and ants (for example *Lasius niger*).

Ticks include, for example, *Ornithodorus moubata*, *Ixodes ricinus*, *Boophilus microplus* and *Amblyomma hebreum*, and mites include, for example, *Varroa destructor*, *Sarcoptes scabiei*, *Dermanyssus gallinae*, *Tetranychus urticae*, *Tetranychus cinnabarinus*, and *Oligonychus pratensis*.

Spiders include, for example, *Lactrodectus mactans*, *Loxosceles recluse*, *Tegenaria agrestis* (*Walckenaer*), *Achaearanea tepidariorum*, *Salticidae*, *Pholcus phalangioides*, and *Lycosa*.

Centipedes include, for example, *Scutigera coleoptrata*.

Scorpions include, for example, *Centruroides exilicauda*, *Centruroides vittatus*, *Hadrurus arizonensis*, and *Solifugae*.

Solifugids include, for example, *Solifugae*.

Preferably, the blood-sucking and biting insects, ticks and mites include mosquitoes, sand flies, biting flies (e.g., black flies, biting midges), bed bugs, ticks, and fire ants (genus *Solenopsis*; for example black imported fire ants, *S. richetri*).

"Optional" or "optionally" means that the subsequently described event or circumstance may or may not occur, and that the description includes instances in which said event or circumstance occurs and instances where it does not. For example, the phrase "optionally comprising an insect attractant" means that the composition may or may not contain an insect attractant and that this description includes compositions that contain and do not contain an insect attractant.

Other compounds (e.g., insect attractants known in the art) may be added to the composition provided they do not substantially interfere with the intended activity and efficacy of the composition; whether or not a compound interferes with activity and/or efficacy can be determined, for example, by the procedures utilized below.

By the term "effective amount" of a compound or property as provided herein is meant such amount as is capable of performing the function of the compound or property for which an effective amount is expressed. As will be pointed out below, the exact amount required will vary from process to process, depending on recognized variables such as the compounds employed and the processing conditions observed. Thus, it is not possible to specify an exact "effective amount." However, an appropriate effective amount may be determined by one of ordinary skill in the art using only routine experimentation.

While this invention may be embodied in many different forms, there are described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments and characteristics described herein and/or incorporated herein. In addition the invention encompasses any possible combination that also specifically excludes any one or some of the various embodiments and characteristics described herein and/or incorporated herein.

The amounts, percentages and ranges disclosed herein are not meant to be limiting, and increments between the recited amounts, percentages and ranges are specifically envisioned as part of the invention. All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10 including all integer values and decimal values; that is, all subranges beginning with a minimum value of 1 or more, (e.g., 1 to 6.1), and ending with a maximum value of 10 or less, (e.g. 2.3 to 9.4, 3 to 8, 4 to 7), and fmally to each number 1, 2, 3, 4, 5, 6, 7, 8, 9, and 10 contained within the range.

Unless otherwise indicated, all numbers expressing quantities of ingredients, properties such as molecular weight, reaction conditions (e.g., reaction time, temperature), percentages and so forth as used in the specification and claims are to be understood as being modified in all instances by the term "about." Accordingly, unless otherwise indicated, the numerical properties set forth in the following specification and claims are approximations that may vary depending on the desired properties sought to be obtained in embodiments of the present invention. As used herein, the term "about" refers to a quantity, level, value, or amount that varies by as much as 10% to a reference quantity, level, value, or amount.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described.

The following examples are intended only to further illustrate the invention and are not intended to limit the scope of the invention as defmed by the claims.

EXAMPLES

The insect pests examined in our research included spotted wing drosophila *Drosophila suzukii* Matsumura, brown marmorated stinkbug *Halyomorpha halys*, diamondback moth, *Plutella xylostella*, gypsy moth, *Lymantria dispar dispar* and red imported fire ants, *Solenopsis invicta* Buren. The red imported fire ant, *S. invicta*, is a significant threat to humans, wildlife, and livestock due to their aggressiveness and poisonous sting (Vinson, S. B., Insect Sci., 20: 439-455 (2013)). Like many other pest insects, management of *S. invicta* also heavily depends on the application of synthetic insecticides (Williams, D. F., et al., Am. Entomol., 47: 146-159 (2001); Drees, B. M., et al., Insect Sci., 20: 429-438 (2013)) and environmentally friendly alternatives are urgently needed.

Besides MB, 14 compounds (in which 9 of them are naturally occurring compounds and the other 5 compounds are commercially available; FIG. 1), were assessed for their contact and/or fumigant toxicities against the above identified insects. The structure-activity relationships were also studied. The 14 compounds were divided into two categories in such a way that one possessed different alcohol portions for evaluating the molecular size/dimension effect, while the other had different substituents on the benzyl ring for examining the electrophilic/nucleophilic aromatic substitution influence. For non-substituted alkyl benzoates, ethyl benzoate (EB), vinyl benzoate (VB), n-propyl benzoate (nPrB), n-butyl benzoate (nBB), iso-butyl benzoate (iBB), n-pentyl benzoate (nPeB), and n-hexyl benzoate (nHB) were tested; while with aromatic substitution, methyl 2-methylbenzoate (M2MB), methyl 2-chlorobenzoate (M2CB), methyl 2-methoxybenzoate (M2MOB), methyl 2-nitrobenzoate (M2NB), methyl 3-methylbenzoate (M3MB), and methyl 3-methoxybenzoate (M3MOB) were assessed. Other than the above compounds, a benzyl ester instead of aliphatic ester, benzyl benzoate (BB), was also examined.

Chemicals: Methyl benzoate, Tween® 20, Tween® 80, ethyl benzoate, vinyl benzoate, n-propyl benzoate, n-butyl benzoate, benzyl benzoate, methyl 2-methylbenzoate, methyl 2-chlorobenzoate, methyl 2-methoxybenzoate, and methyl 2-nitrobenzoate were purchased from Sigma-Aldrich (St. Louis, Mo.). Compounds iso-butyl benzoate, n-pentyl benzoate, and n-hexyl benzoate were purchased from Alfa Aesar (Tewksbury, Mass.). Methyl 3-methoxybenzoate (methyl m-anisate) and methyl 3-methylbenazoate (methyl m-toluate) were purchased from TCI America (Portland, Oreg.). Acetone was used as solvent and purchased from Sigma-Aldrich (St. Louis, Mo.). All chemicals were used without further purification. Commercial pesticides: Distance insect growth regulator was purchased from Valent (Walnut Creek, Calif.), and TriStar 8.5 SL insecticide was purchased from Cleary Chemical (Alsip, Ill.). The active ingredients and corresponding concentrations for the above commercial pesticides are listed in Table 3.

Insects: The *H. halys* adults, nymphs, and eggs were obtained from a colony maintained in the facility located at USDA, ARS, Beltsville, Md. The *H. halys* colony was established in 2007 from adults collected in Allentown, Pa. Insects were reared on a diet of organic green beans and shelled sunflower and buckwheat seeds (2:1, w/w) in ventilated plastic cylinders and maintained in Percival incubator at 25° C. and 60% RH, under a 16L:8D photoperiod (Khrimian, A., et al., J. Nat. Prod., 77: 1708-1717 (2014)). Organic green beans were purchased from MOM's organic market (College Park, Md). Insect eggs were collected weekly and hatched in plastic Petri dishes with a water vial, and after molting to second-instars, the nymphs were transferred to ventilated plastic cylinders for the remaining fourth instars (Heinrich, B., Bumblebee Economics: With a New Preface, Harvard Univ. Press, Cambridge, Mass., 2004)).

Adult males and females were separated 1 or 2 days after emergence and subsequently maintained in different containers.

The *P. xylostella* colony was reared and maintained on an artificial wheat germ diet (Shelton, A. M., et al., J. Entomol. Sci., 26: 17-26 (1991)) at the same USDA facility. Eggs and larvae were put in closed cardboard cups (236 mL, 8.9 cm diameter, 5.7 cm height, Solo Cup Company, Lake Forest, Ill.) and kept in an incubator (Percival Scientific Inc, Perry, Iowa) at 25° C., 34% RH, under a 16L:8 D photoperiod in the same insectary. Adults were maintained in screened cage (30.5 cm×30.5 cm×30.5 cm, BioQuip Inc). Eggs were deposited on aluminum foil strips (approx. 5.0×30.5 cm) dipped in cabbage juice and collected after 3-4 days.

The *L. dispar* colony was reared and maintained on a simplified artificial wheat germ diet (one liter of diet contains 120 g wheat germ, 10 g USDA vitamin, 25 g casein, 8 g Wesson salts, 2.5 g sorbic acid, 1 g methylparaben, 15 g agar, and 825 g DI water) at the same USDA facility. Egg masses were received from CPHST Otis laboratory (APHIS, Buzzard's Bay, Mass.) on a monthly basis in a cardboard cylinder in a refrigerated carton, and kept in a refrigerator until used. Egg masses were stapled to the cardboard lids (Solo Cup, Lake Forest, Ill.). Larvae were kept in plastic cups (6 oz, Solo Cup, Lake Forest, Ill.) that have about 1 cm of diet poured into the bottom and closed with cardboard lids. Eggs and larvae were kept in an incubator (Percival Scientific Inc, Perry, Iowa) at 25° C., 40%-50% RH, under a 16L:8 D photoperiod in the same insectary. Adults were not kept at the insectary. The larvae used in the bioassay were 1~2 days old in the first stage.

The *D. suzukii* colony was provided by Rutgers University. The colony was reared on cornmeal diet (Dalton, D. T., et al., Pest Manage. Sci., 67: 1368-1374 (2011)) in polystyrene vials with plugs and kept in a Percival incubator at 25° C., 34% RH, under a 16L:8 D photoperiod in USDA, ARS, Beltsville facility. Blueberries (Cottle Farms, Cottle Strawberry Nursery, Inc, Faison, N.C.) used in insecticidal activity evaluation were purchased from MOM's organic market, College Park, Md.

The *S. invicta* colonies were collected from Washington County, Miss. Colonies were separated from soil using water dripping method (Banks, W. A., et al. Techniques for collecting, rearing, and handling imported fire ants IN Advances in Agricultural Technology (Agricultural Research) (Southern Region), Science and Education Administration, USDA, 1981), Vol. NS-21, pp. 1-9) and reared in a plastic trays (44.5×60.0×13.0 cm). The social form of S. invicta colonies was determined using PCR on Gp-9 alleles (Valles, S. M., and S. D. Porter, Insectes Soc., 50: 199-200 (2003)). All ants used in laboratory bioassays were from monogyne colonies and kept in USDA, ARS, National Biological Control Laboratory, Stoneville, Miss. facility. Same diet (10% sugar water and house crickets) was used for rearing all laboratory colonies. Colonies were maintained in a rearing room at 25° C., 80% R.H. with a 12:12 (L:D) photoperiod.

Laboratory bioassays: Bioassays were conducted in USDA Beltsville laboratory at 25° C., 60% RH, under a 16L:8D photoperiod with ~1700 lux light illuminance. A fume hood was maintained at same conditions with face velocity at 129 FPM. The plastic cups (32 oz, diameter 4.5 inches, deep 5 inches) were purchased from papermart.com (CA). In the cover was cut an 80 mm diameter hole and glued with an 85 mm diameter mesh (mesh size, 81×81, BioQuip, CA). The polystyrene vials (height, 95 mm, diameter, 28.5 mm) and plugs were obtained from Fisher Scientific (Pittsburg, Pa.). The plastic cage (30×30×30 cm) was purchased from BugDorm (Rancho Dominguez, Calif.). Glass vial (20 mL), glass spray bottle (Amber glass with spray top, 30 mL), Petri dish (9 cm diameter), and Whatman filter paper (90 mm diameter) were obtained from VWR (Atlanta, Ga.). Deionized water (DI) containing 1% emulsifier (surfactant) (v/v), Tween 20 and Tween 80, at 1:1 ratio was used to make different VOCs water solutions and also used as blank control.

Impacts of MB and other compounds on *D. suzukii* control: To investigate the acute toxicity of some compounds of formula 1 against *D. suzukii*, a published procedure was followed (Cuthbertson, A. G. S., et al., Insects, 5: 488-498 (2014)). First, mixed-sex adults *D. suzukii* (100) were introduced into a plastic cage (30×30×30 cm) and reared on blueberries (100) for 4 days. After that, the infested blueberries were taken out from the cage. Half of the blueberries (50) were dipped in 100 mL aqueous emulsion of each compound listed in Table 1 at 1% concentration for 2 min as treatment, while the other half of the blueberries (50) were dipped in DI water for 2 min as blank control. Then the corresponding blueberries were separately taken out, placed in two different Petri dishes, and allowed to air dry for 2 h. Second, treatment and blank control blueberries were respectively stored in two plastic cups (32 oz) with closed caps and incubated at room temperature for 10 days. The emergence of adults was then subsequently assessed. The developments of larvae and pupae were further inspected by dissection of the treatment and blank control berries. Each treatment and blank control was repeated three times.

Toxicities of MB, some compounds of formula 1, and commercial pesticides on *H. halys* nymphs: The bioassays were carried out in glass vials (20 mL), following a published procedure (Nielsen, A. L., et al., J. Econ. Entomol., 101: 1439-1442 (2008)). Filter paper was cut into round shape pieces (2.4 cm diameter). 50 µL acetone solution of one derivative or commercial pesticide with different concentrations was loaded onto the filter paper evenly, and the filter paper was dried for 1 min and then put into the bottom of vial. A small piece of green bean was put on the filter paper in the vial as food source. Different stages of *H. halys* nymphs were introduced into the vial and capped with a cotton ball. For each stage, 30 nymphs were used for each amount. For the nymphs of the first instar, 10 nymphs were put into 1 vial. For the nymphs of the second and third instar, 5 nymphs were put into 1 vial. For the nymphs of the fourth instar, 3 nymphs were put into 1 vial. For the nymphs of the fifth instar, 2 nymphs were put into 1 vial. The mortality was assessed after 24 hr. Mortality data was subjected to probit analysis using Polo Plus for $LC_{50}$ with 95% confidence intervals calculation.

Ovicidal toxicities of MB and some compounds of formula 1: The aqueous solutions of one of the compounds of formula 1 with designated concentrations with different concentrations of active ingredient (AI) were separately stored in glass spray bottles according to a published procedure (Cuthbertson 2014). The eggs (10 for *H. halys* and 100 for *P. xylostella*) were laid on filter papers in Petri dishes. Different aqueous insecticidal solutions were sprayed on the surfaces of different eggs three times (~0.5 mL) to completely cover the treatment areas. Then the Petri dishes were covered with lids and maintained in a fume hood for 10 days. The Petri dishes were then inspected for presence of nymph/larvae development or numbers of unhatched eggs.

Toxicities of MB and some compounds of formula 1 on *L. dispar* larvae: The bioassays were carried out in plastic Petri dish loaded with filter paper, following a published procedure (Nielsen 2008). 600 µL acetone solution of one derivative with different concentrations was loaded onto the filter paper (90 mm diameter) evenly, and the filter paper was dried for 2 min and then put into the bottom of Petri dish. 10 L. dispar larvae were put onto the Petri dish and covered with a lid. 30 larvae were used for each amount. The mortality was assessed after 24 hr. Mortality data was subjected to probit analysis using Polo Plus for $LC_{50}$ with 95% confidence intervals calculation.

Fire ant bioassays were conducted in USDA, ARS Stoneville laboratory at 25° C., 80% R.H. with a 12:12 (L:D) photoperiod. Contact toxicities of MB and some compounds of formula 1 against fire ants: Topical application was used for contact toxicity bioassay. Only large workers were used for a purpose of relatively uniform body weight and ease of handling. For all compounds, acetone was used as a solvent. The solution was applied using a 0.779 µl capillary tube. Two experiments were conducted for assessing contact toxicity. In experiment #1, mortality was measured at a dose of 77.9 ug/ant for all 15 benzoates. In experiment #2, $LD_{50}$ values were established for the top 9 most toxic benzoates selected from experiment #1. In order to investigate the structure-activity relationship, $LD_{50}$ values were also established for MB and EB. For nPrB, it was established for 2 of 3 colonies. For the other 10 compounds of formula 1, $LD_{50}$ values were successfully established for 3 colonies. For each $LD_{50}$ value, 5 doses of benzoates were used. Each dose was replicated 3 times. Each replicate consisted of 13 to 18 ants. Treated ants were placed in a 30-ml capped cup and dead ants were counted after 24 h.

Fumigant toxicities of MB and some compounds of formula 1 against fire ant: Fumigant toxicities were also assessed for all 15 benzoates. A 250-ml glass flask (the whole volume is 280 ml) was used to house worker ants in fumigant toxicity bioassays. Two micro-liter of acetone solution of the tested compound was applied onto a paraffin film, which was used to seal the flask with ants. The treated spot of the paraffin film faced the inside of the flask. The upper part of the flask was coated with Fluon® to prevent ants from contacting the test material. Two experiments were conducted. In experiment #1, 24 h mortalities were obtained for each compound at the dosage of 1.43 mg/L. In experiment #2, $LC_{50}$ values were established for the top 5 most toxic benzoates selected from experiment #1. $LC_{50}$ value was established using 5 dosages. Each dosage was replicated 3 times for each of 3 colonies. Each replicate consisted of 15 to 26 ants. Ants that could not stand by themselves were considered dead. Dead ants were counted after 24 h.

Release rate: Release rate tests of selective compounds were carried out in the laboratory. 1 mL of each compound was loaded on a cotton ball in a polypropylene flex tube (1.5 mL Eppendorf micro-centrifuge tube, VWR International, Radnor, Pa.). The tubes were hung in the hood with air flow of 129 FPM. At 2 pm on each weekday, the tubes were weighed and recorded (Zhang, A., et al., Environ. Entomol., 37: 719-724 (2008)). Each treatment was replicated 5 times.

Data analysis: Comparisons of different treatments were analyzed using one-way ANOVA followed by Turkey-HSD test (KaleidaGraph, Synergy Software, for significance at α=0.05). Polo Plus software (LeOra Software, Berkeley, Calif.) was used to conduct probit analysis for mortality data, and $LC_{50}$ with 95% confidence limits (CLs) were estimated (Robertson, J. L., et al., Bioassays with Arthropods, Second ed. CRC Press Baco Raton, Fla., 2007). For comparison in mortalities between different treatments, analysis of variance (PROC GLM; SAS Institute 2008) was performed and means were separated using Tukey's Multiple Comparison Test (P<0.05).

Results. Insecticidal activities against D. suzukii: Among MB and 15 compounds of formula 1 tested, 9 of them surprisingly exhibited potent toxicities against D. suzukii (Table 1). Direct application at 1% concentration of them on 4 days pre-infested blueberries caused complete mortality, and no larvae and pupae developed or adult flies emerged after 10 days incubation at room temperature (Table 1). Surprisingly, toxicities were significantly affected by alkyl chain length/dimension of alcohol portion of compounds of formula 1 tested. Although compound of formula 1 nPrB did not have the same efficiency compared with the most potent 9 compounds, it still surprisingly showed good insecticidal toxicity against D. suzukii. However, when the carbon number of the alcohol portion increased to more than three, surprisingly the insecticidal toxicities were significantly decreased. It was negatively correlated with the carbon number of the alcohol chain length ($R^2$ larvae=0.9293; $R^2$ pupae=0.9270; $R^2$ adult=0.7739) (FIG. 2). When chain length of the alcohol increased to more than 4, nPeB and nHB surprisingly did not show any insecticidal activities compared with the blank control (Table 1). Surprisingly the same poor toxicities were observed with two compounds of formula 1 tested with bulky alcohol dimension, iBB and BB. On the other hand, aromatic substitution of MB surprisingly did not affect the insecticidal activity at all. Some compounds of formula 1 with different functional groups on the benzene ring surprisingly showed the same potent toxicities as MB against D. suzukii (Table 1).

Nymphicidal effects against H. halys: 14 compounds of formula 1 and 2 commercial insecticides were tested against H. halys nymphs at the different stages (Table 2). Surprisingly, similar results compared with D. suzukii were obtained; nPeB and nHB did not show toxicities. Some compounds of formula 1 with alkyl chain length less than three carbons surprisingly gave $LC_{50}$ values from 0.97 to 2.43 µL/vial. They were surprisingly comparable with two commercial pesticides containing Acetamiprid and Pyriproxyfen (Table 3) tested in lab bioassays ($LC_{50}$ values from 0.26 to 2.70 µL/vial) (Table 2). Once again, two compounds of formula 1 with bulky alcohol dimension, iBB and BB, exhibited deficient toxicities against H. halys nymphs. All compounds of formula 1 listed in Table 2 with different aromatic substituents did not affect the nymphicidal effects against H. halys with the surprising exception of one electrophilic aromatic substitution compound of formula 1, (M2NB), which was ineffective (Table 2).

Figure 3:
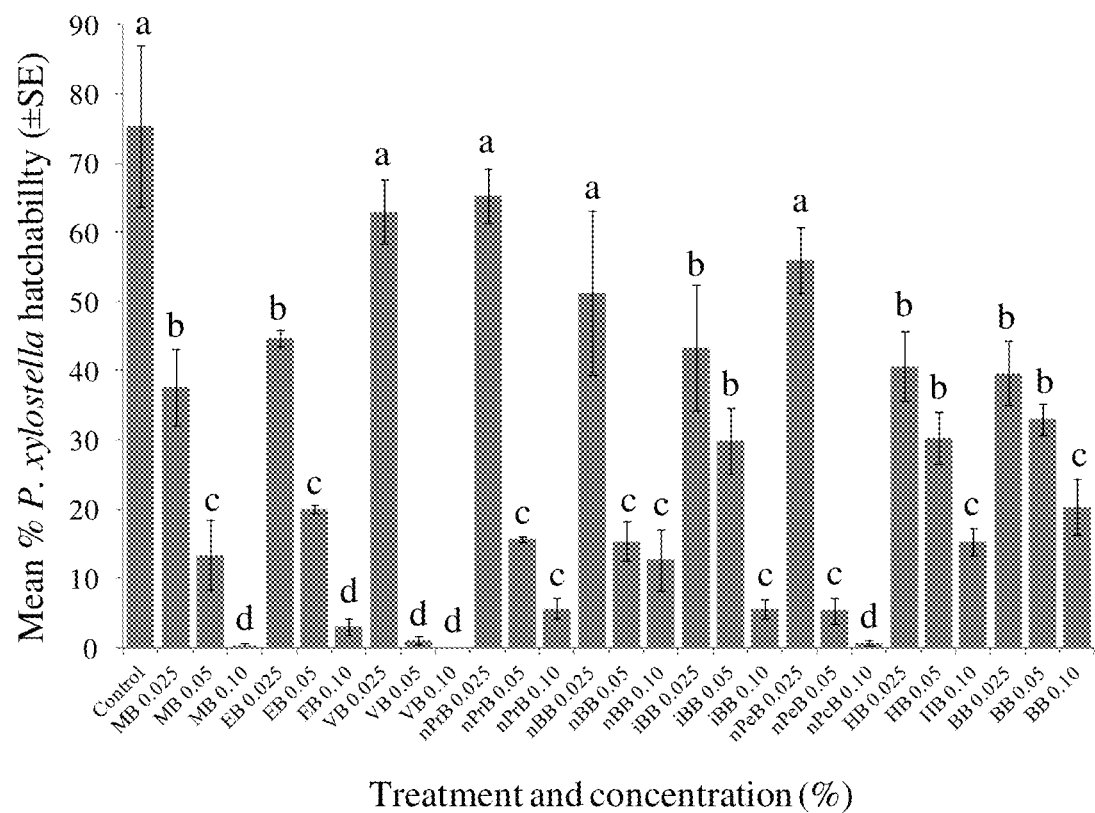
FIG. 3 shows ovicidal impacts of selective compounds against *Plutella xylostella* eggs (100 eggs were used in each bioassay) as described below. Hatchability was accessed after 10 days incubation at room temperature. Means followed by the different letters are significantly different at a=0.05 (N=3, F=25.969; df=27, p<0.0001).

Ovicidal toxicities against H. halys and P. xylostella: The ovicidal toxicities of MB and some compounds of formula 1 were evaluated by measuring hatching in direct spray bioassay on H. halys and P. xylostella eggs. Compounds of formula 1 listed in Table 4 with alkyl chain length of more than two carbons were surprisingly ineffective against H. halys eggs, while substituents on benzene ring surprisingly did not significantly affect the ovicidal toxicities (Table 4). For P. xylostella, surprisingly VB showed the highest toxicity. At 0.05% concentration, it exhibited the same toxicities compared with MB, EB, and VB at 0.1% concentrations against P. xylostella eggs (FIG. 3). Surprisingly, nPeB with 5 carbon chain length also showed comparable toxicity comparing with MB at 0.1% concentrations (FIG. 3).

Larvicidal toxicities against L. dispar: Surprisingly VB showed the highest larvicidal toxicity against L. dispar ($LC_{50}$=0.065 mg/cm$^2$), which was 3.4 times more toxic than commercial pesticide acetamiprid ($LC_{50}$=0.221 mg/cm$^2$)

and 1.3 times more toxic than commercial pesticide pyriproxyfen (LC$_{50}$=0.086 mg/cm$^2$) (Table 5). Once more, two compounds of formula 1 with bulky alcohol dimension, HB and BB, and one compound of formula 1 (M2NB) with electrophilic aromatic substitution, did not show any toxicities. Notably, two compounds of formula 1 with nucleophilic aromatic substitutions, M2MOB (LC$_{50}$=0.230 mg/cm$^2$) and M3MOB (LC$_{50}$=0.234 mg/cm$^2$), decreased toxicities by half (50%) compared with MB (LC$_{50}$=0.114 mg/cm$^2$) against *L. dispar* larvae (Table 5).

Figure 4:
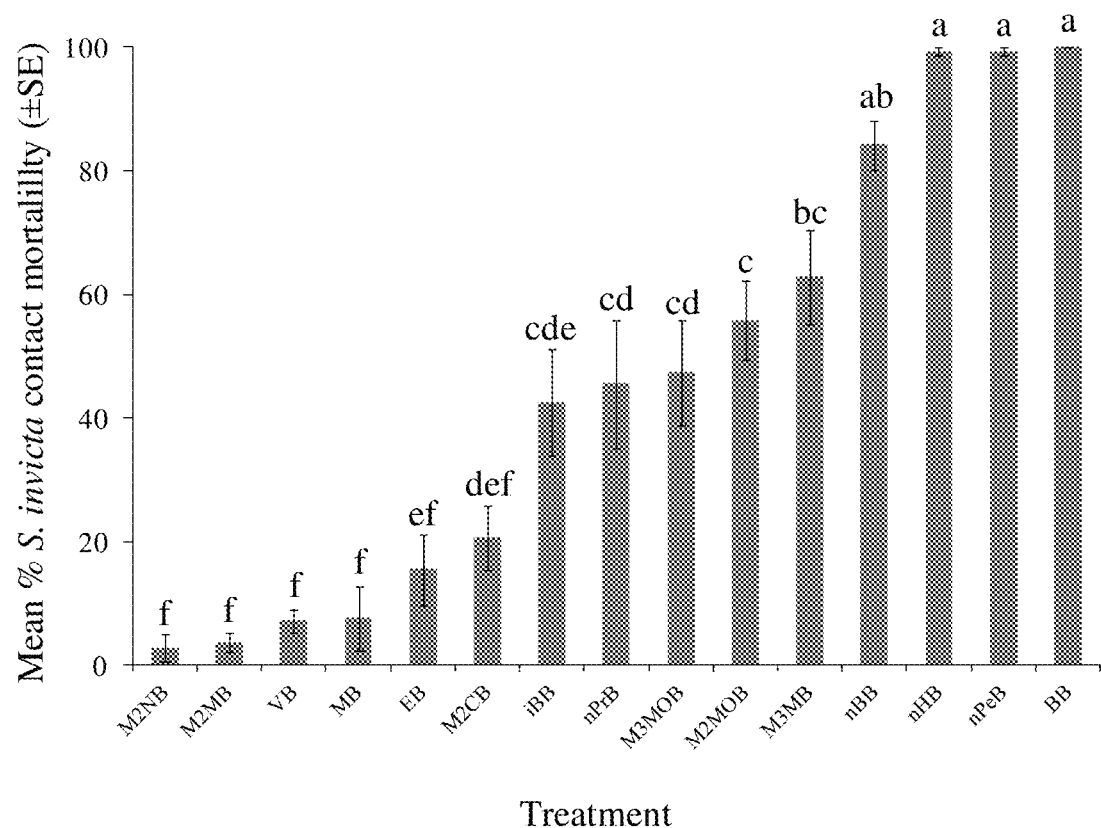
FIG. 4 shows mean mortalities (%) of *Solenopsis invicta* workers at 24 h after being topically treated with MB and compounds at a dose of 77.9 µg/ant as described below. Means followed by the different letters are significantly different at a=0.05.

Contact toxicities against *S. invicta*: Two experiments were conducted for contact toxicity evaluation. In experiment #1, a fixed dose (77.9 μg/ant) of some compounds of formula 1 listed in FIG. 4 was used to measure *S. invicta* mortality. The mean mortality for each benzoate is shown in FIG. 4. The most bulky compound of formula 1, BB, surprisingly caused 100% mortality. Three other compounds of formula 1, including nHB, nPeB, and nBB, surprisingly resulted in comparable results (FIG. 4). Our results surprisingly indicated that the contact toxicity of non-substituted compounds of formula 1 tested was significantly affected by alkyl chain length/alcohol dimension. When carbon numbers of alcohol in benzoate molecule were increased from 1 to 3 (from MB to nPrB), mean mortalities were surprisingly increased 6 times (from 7.67% to 45.5%); while carbon numbers of alcohol in benzoate molecule were increased from 1 to 5 (from MB to nPeB), mean mortalities were surprisingly increased 13 times (from 7.67% to 99.26%). Contact toxicities of compounds of formula 1 tested against *S. invicta* were also significantly affected by aromatic substitution, although it was not as strong as alkyl chain length. For MB, surprisingly nucleophilic aromatic substitutions (M3MOB and M2MOB) significantly increased mean toxicities 6 and 7 times (from 7.67% to 47.23% and 55.74%) (FIG. 4).

Figure 5:
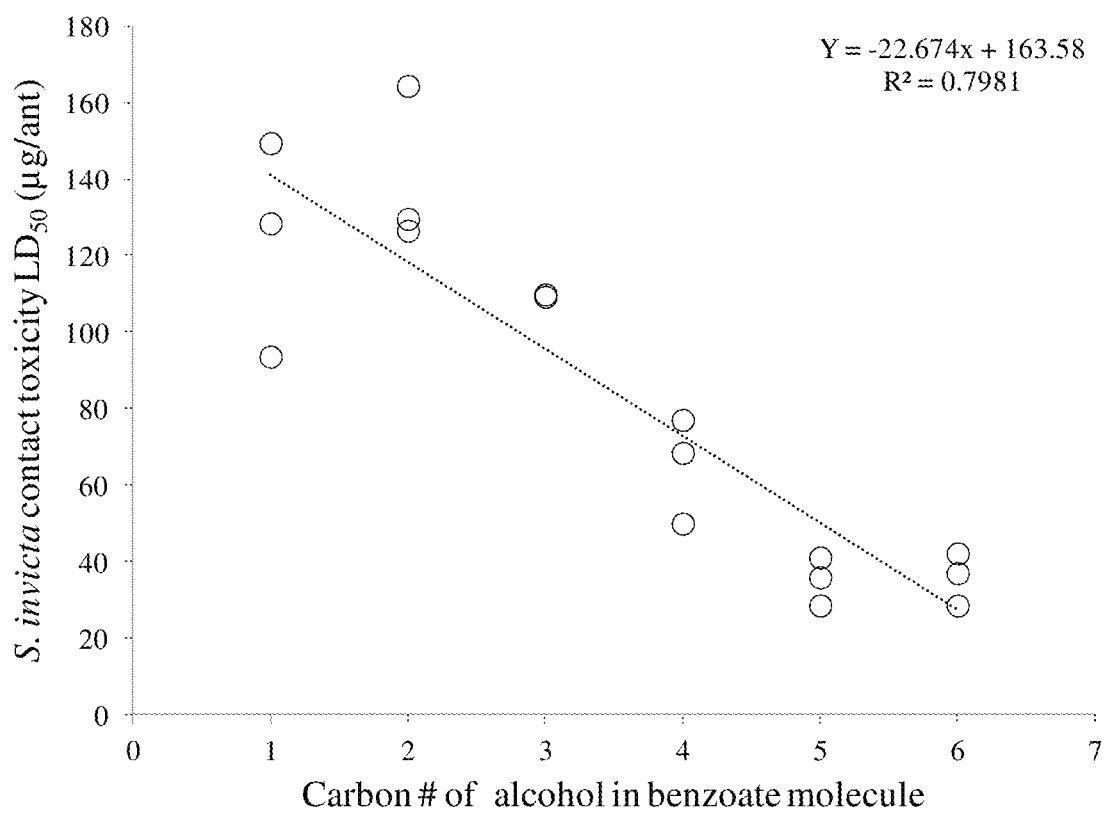

In experiment #2, contact LD$_{50}$ values were obtained based on serious different concentrations of the top 9 most toxic compounds of formula 1 selected from experiment #1, and compared with MB and EB (Table 6). For non-substituted compounds of formula 1 tested, surprisingly acute contact toxicities against *S. invicta* were positively correlated (R$^2$=0.7981) with the carbon numbers of alcohol in benzoate molecule (FIG. 5).

Figure 6:
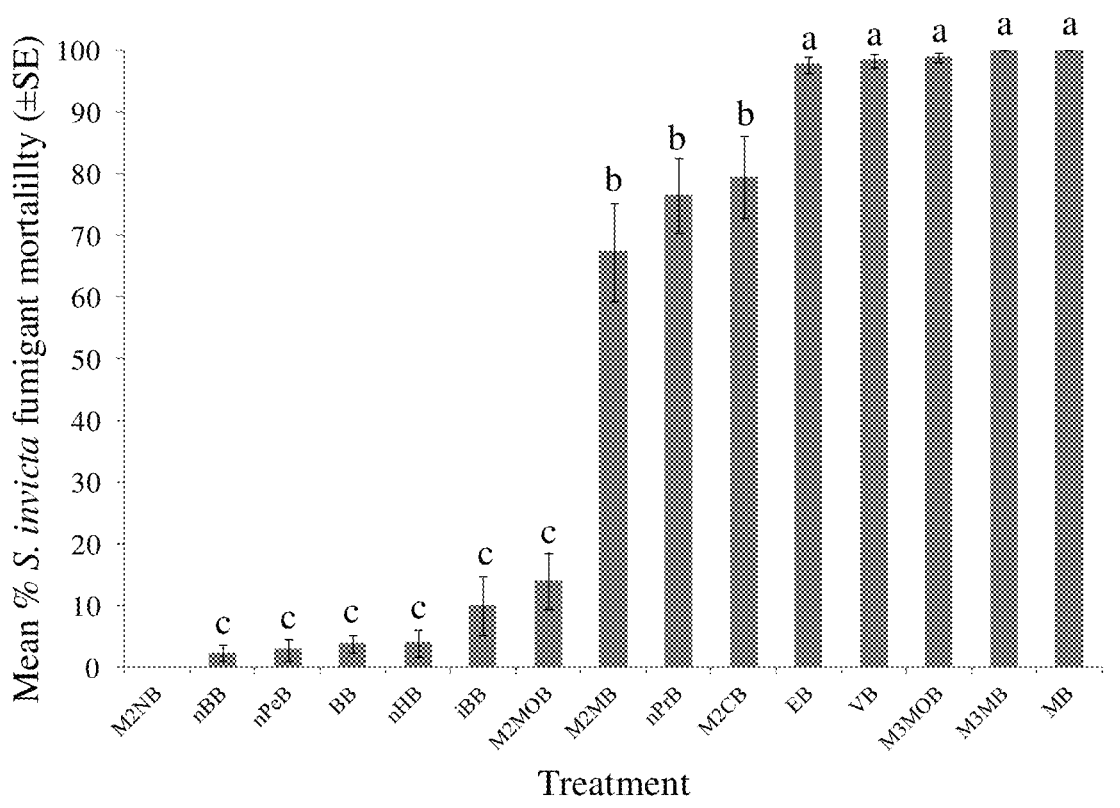
Figure 7:
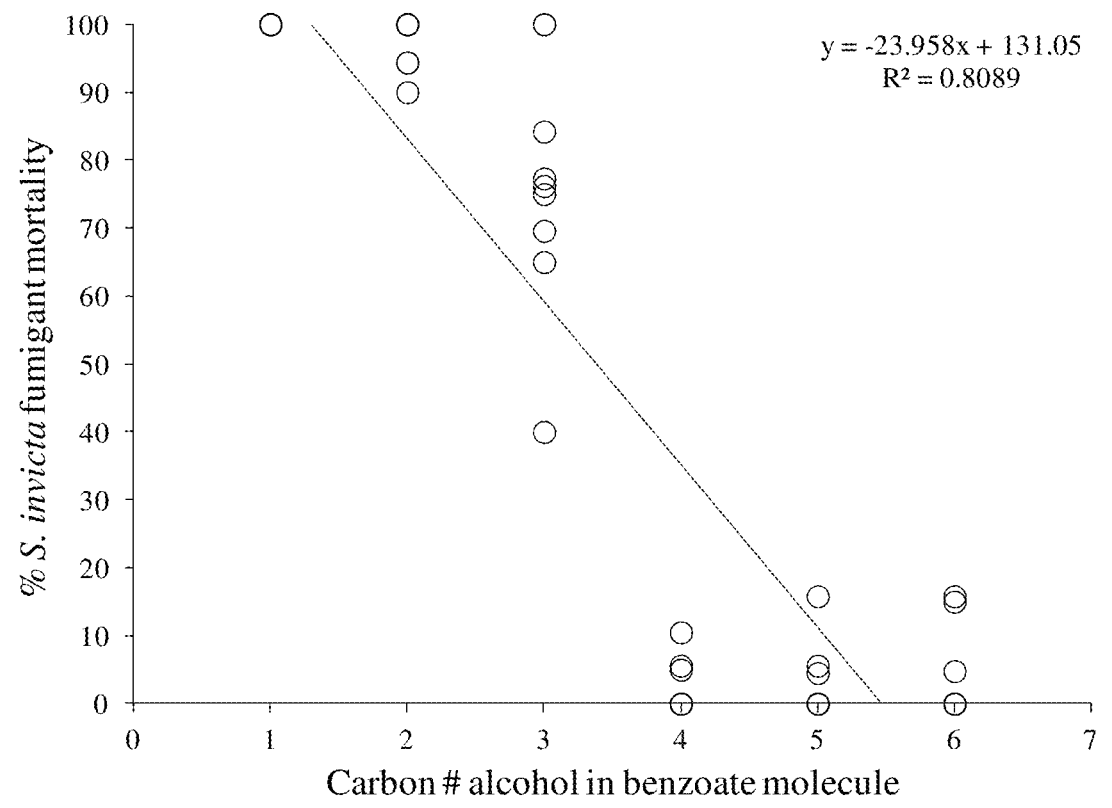

Fumigant toxicities against *S. invicta*: Same as contact toxicity evaluation, two experiments were conducted for fumigant toxicity assessment. In the first experiment, mortalities were measured after 24 h treatment of 15 benzoates with a dosage of 1.43 μg/ml. The mean mortality for each benzoate is shown in FIG. 6. Five compounds, MB, VB, M3MB, M3MOB, and EB surprisingly exhibited potent fumigant toxicities and resulted in ~100% *S. invicta* mortalities. Three compounds of formula 1, M2CB, nPrB, and M2MB, caused ~70-80% *S. invicta* mortalities and all others were surprisingly not effective. Clearly, the fumigant toxicities of non-substituted compounds of formula 1 tested were also surprisingly and significantly affected by alkyl chain length/alcohol dimension. On the contrary with contact toxicities, fumigant toxicities were surprisingly reduced with increasing the carbon numbers of alcohol in benzoate molecule. When carbon numbers of alcohol in benzoate molecule were increased from 1 to 3 (from MB to nPrB), mean mortalities were surprisingly decreased from 100% to 79.4%; while carbon numbers of alcohol in benzoate molecule were increased from 1 to 4 (from MB to nBB), mean mortalities were surprisingly decreased 42 times (from 100% to 2.34%) (FIG. 6). For non-substituted compounds of formula 1 tested, surprisingly acute fumigant toxicities against *S. invicta* were negatively correlated (R$^2$=0.8089) with the carbon numbers of alcohol in benzoate molecule (FIG. 7).

It was noticed that compounds of formula 1 tested with the electrophilic aromatic substitution surprisingly and significantly reduced the toxicity. One compound of formula 1 (M2CB) surprisingly and significantly reduced the fumigant toxicity of MB from 100% to 79.4%, while another compound of formula 1 (M2NB) surprisingly completely annihilated the fumigant toxicity of MB from 100% to 0% (FIG. 6). For compounds of formula 1 tested with nucleophilic aromatic substitution, the position of substituent on the benzene ring sometimes was surprisingly critical. When methoxyl or methyl group was on the meta position of the benzene ring (M3MOB or M3MB), surprisingly the fumigant toxicities were not significantly affected. However, when methoxyl or methyl groups were on the ortho position, surprisingly the fumigant toxicities were significantly reduced (M2MOB or M2MB) (FIG.6).

Fumigant LC$_{50}$ values were acquired from the top 5 most toxic benzoates in the second experiment (Table 7). Ranked by the means LC$_{50}$ values, surprisingly M3MOB, M3MB, and MB were the three most potent fumigant toxins against *S. invicta* among the 15 tested benzoates (mean LC$_{50}$ value=0.61, 0.65, and 0.75 μg/ml respectively), followed by VB and EB (LC$_{50}$ value=0.89 and 0.93 μg/ml respectively).

Figure 8:
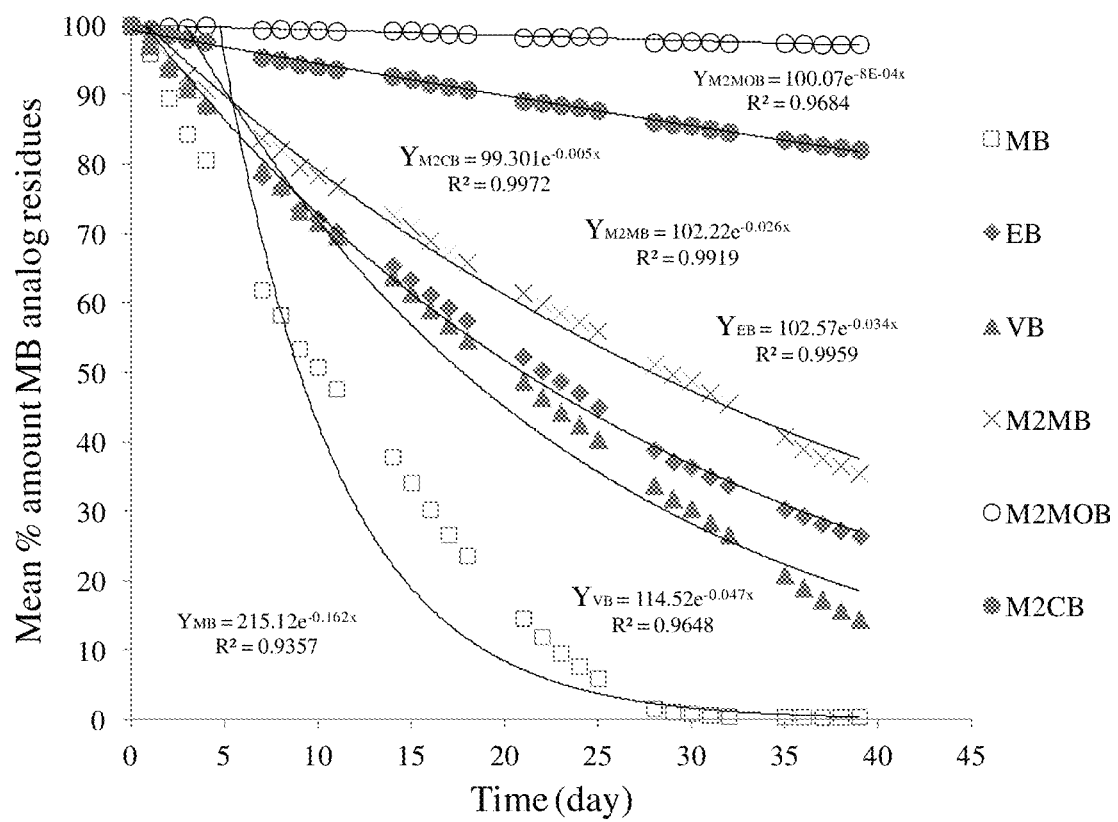
FIG. 8 shows release rates of MB and selected compounds (N=5) as described below.

Release rate: Selective MB and some compounds of formula 1 were examined for their release rates at room temperature (FIG. 8). All evaporation rates followed first order kinetics (Y$_{MB}$=215.12e$^{-0.162x}$, R$^2$=0.9357; Y$_{VB}$=114.52e$^{-0.047x}$, R$^2$=0.9648; Y$_{EB}$=102.57e$^{-0.034x}$, R$^2$=0.9959; Y$_{M2MB}$=102.22e$^{-0.026x}$, R$^2$=0.9919; Y$_{M2CB}$=99.301e$^{-0.005x}$; R$^2$=0.9972; Y$_{M2MOB}$=100.07e$^{-8E-04x}$, R$^2$=0.9684). MB was the most volatile compound with half life time (t$_{1/2}$=0.693/k=0.693/0.162=4.3 d), surprisingly followed by VB (t$_{1/2}$=15 d) and EB (t$_{1/2}$=20 d), while M2CB and M2MOB were not very volatile with half life times of t$_{1/2}$=139 d and 866 d respectively.

Discussion: The previous study from our lab showed that MB, a VOC identified from apple juice, was a powerful green pesticide against several invasive insect species (Feng and Zhang 2017). Current research demonstrated that some compounds of formula 1 surprisingly also exhibited some extent of fumigant/contact toxicities. Among 15 chemicals tested, 10 of them are natural occurring compounds: MB (Kolosova, N., et al., Plant Cell, 13: 2333-2347 (2001); Heinrich 2004; Dudareva, N., et al., Plant Cell, 12: 949-961 (2000); Monteiro, I. N., et al., Vet. Parasitol., 238: 54-57 (2017); Fombong, A. T., et al., J. Chem. Ecol., 42: 1063-1069 (2016); Brunke, E. J., et al., Flower scent of some traditional medical plants in Bioactive volatile compounds from plants ACS symposium series, edited by Roy Teranishi et al., Amer. Chemical Soc, Washington, D.C., 525: 282-296 (1993); Chen, J., Anal. Chem., 89: 8366-8371 (2017)), EB (Sostaric, T., et al., J. Agric. Food Chem., 48: 5802-5807 (2000)), M2MB (Kaiser, R., The scent of orchids: olfactory and chemical investigations, Elsevier, Amsterdam, Givavdan-Roure, 1993), M2MOB (Joulain, D., Flavour Fragrance J., 2: 149-155 (1987)), nPrB (Selles, A. J. N., et al., J. Agric. Food Chem., 50: 762-766 (2002)), nBB (Skubatz, H., et al., New Phytol., 134: 631-640 (1996)), nPeB (Phamdelegue, M. H., et al., J. Chem. Ecol., 15: 329-343 (1989)), iBB (Rodriguez Madrera, R., et al., Lwt—Food Sci. Technol., 64: 1342-1353 (2015)), nHB (Monteiro 2017; Fombong 2016; Brunke 1993; Chen 2017; Kaiser 1993), and BB (Monteiro 2017; Fombong 2016; Brunke 1993; Chen 2017; Schwerdtfeger, M., et al., Selbyana, 23: 258-267

(2002))) (FIG. 1). Compounds, including MB, EB, nPrB, M2MOB, iBB, and BB have been approved by the US Food and Drug Administration (21 CFR 172.515) and the European Union (EU Regulation 1334/2008 & 178/2002) for use as flavoring substances and adjuvants. For example, MB has an odor similar to cananga and up to 45.63 ppm has been used in chewing gum; nHB has a woody-green, piney, balsamic odor and up to 10.00 ppm has been used in baked goods; and BB has a light, balsamic odor reminiscent of almond and up to 98.91 ppm has been used in alcohol beverage (Burdock, G. A., Fenaroli's handbook of flavor ingredients, 6th ed., CRC Press, Taylor & Francis, Boca Raton, Fla., 2009).

In nature, MB has been used by flowers and insects as semiochemicals (Kolosova 2001; Heinrich 2004; Dudareva 2000; El-Sayed, A. M., The pherobase: database of insect pheromones and semiochemicals (2017)). Besides the work of Feng and Zhang 2017, pesticidal activity of MB has never been reported. Although many naturally occurring compounds such as citrus oil (Vogt, J. T., et al., J. Agric. Urban Entomol., 19: 159-171 (2002)), mint oil (Appel, A. G., et al., J. Econ. Entomol., 97: 575-580 (2004)), and essential oil from *Cinnamomum osmophloeum* leaf (Cheng, S. S., et al., Bioresour. Technol., 99: 889-893 (2008)) have been described to be toxic and/or repellant to *S. invicta* (Appel 2004; Cheng 2008; Chen, J., J. Agric. Food Chem., 57: 618-622 (2009); Chen, J., et al., J. Econ. Entomol., 101: 265-271 (2008); Drees, B. M., Southwest. Entomol., 27: 177-183 (2002)), the major components identified from the above essential oils have been found to cause skin or eye irritation and have aquatic toxicities, and therefore are not suitable for fire ants control.

This study demonstrated that MB and 14 compounds of formula 1 surprisingly showed different toxicities against four insect species, including *D. suzukii, H. halys, P. xylostella, M. sexta*, and *L. dispar*. In addition, four compounds of formula 1, nBB, nHB, nPeB, and BB, surprisingly exhibited potent contact toxicities; and another four compounds of formula 1, VB, M3MOB, M3MB, and MB surprisingly displayed powerful fumigant toxicities against *S. invicta* workers. nHB has neither known OSHA hazards nor aquatic toxicity and M3MOB is not even considered as a hazardous substance based on the Safety Data Sheet (SDS) from the producer (Sigma-Aldrich, Saint Louis, Mo.). M3MOB exhibited a surprisingly high fumigant toxicity when used against fire ants.

For non-substituted compounds of formula 1 tested, toxicities against insects were significantly affected by molecular size/dimension. Generally speaking, the bigger the esters (longer carbon chain in alcohol or bulky alcohol, e.g., hexyl benzoate or benzyl benzoate), the higher contact and lower fumigant toxicities were surprisingly obtained. Surprisingly, the insecticidal toxicities against *D. suzukii* larvae/pupae development and adult emergency, larvicidal toxicities against *L. dispar*, as well as the fumigant toxicity against *S. invicta* workers were negatively correlated with alkyl chain length or alcohol dimension; while the contact toxicity against *S. invicta* workers was positively correlated with alkyl chain length or dimension. However, ovicidal toxicity against *H. halys* surprisingly disappeared when the alkyl group was increased to more than three carbons.

Aromatic substitution on the benzene ring or alkyl chain length of alcohol in MB molecule could significantly affect the toxicities of some compounds of formula 1 against insects. For tested benzoate compounds of formula 1, surprisingly electrophilic aromatic substitution usually significantly reduced fumigant toxicity (e.g., methyl 2-nitrobenzoate) while nucleophilic aromatic substitution significantly increased contact toxicities (e.g., 2- or 3-methoxyl benzoate) against *S. invicta*. However, aromatic substitutions of different functional groups on the benzene ring surprisingly did not change the insecticidal toxicities against *H. halys* eggs and *D. suzukii* larvae/pupae development and adult emergency. Surprisingly, substitution of a methoxyl group to either the ortho (M2MOB) or meta (M3MOB) position significantly reduced larvicidal toxicity against *L. dispar* but significantly increased contact toxicity against *S. invicta* workers. Interestingly, the functional groups showed different effects for the fumigant toxicity against *S. invicta* workers. Surprisingly it was not affected by substitution of methyl or methoxyl group on the meta position, however it was significantly reduced by substitution of methyl, methoxyl, chloro, or nitro groups on the ortho position.

In general, fumigants used in insect pest control are small molecules with high volatilities so that they can exist in the gaseous state in sufficient concentration to be lethal to a given pest organism (Bond, E. J., Manual of fumigation for insect control, Food and Agriculture Organization of the United Nations, 1984). While the contact toxicants usually are large molecules and non-volatiles so that they can be commonly acquired by insects via ingestion or contact (Kupferschmied, P., et al., Front. Plant Sci., 4: 287 (2013)). It is in good coincident with our release rate study and lab bioassay results: surprisingly the fumigant toxicity was negatively correlated with alkyl chain length or alcohol dimension while the contact toxicity was positively correlated with alkyl chain length or dimension against *S. invicta* workers. Without being bound by theory, another explanation of good contact toxicities for larger molecules and non-volatile compounds of formula 1 tested may be due to their better liposolubilities, so that compounds can surprisingly penetrate through cuticles easier to get inside the target organism.

Surprisingly, aromatic substitution on the benzene ring could more seriously affect the release rates of compounds of formula 1 tested than the extension of the alkyl chain length of alcohol (FIG. 8). Our release rate study indicated that MB was the most volatile compound among the compounds of formula 1 tested. The closest compound of formula 1 to MB, EB, only has one more carbon increase in alkyl chain length; however, half life time $t_{1/2}$ was surprisingly increased from 4.3 d to 15 d. For compounds of formula 1 tested with aromatic substitution, surprisingly M2CB and M2MOB showed extremely low volatiles with half life times $t_{1/2}$=139 d and 866 d, respectively. However, two compounds of formula 1 tested with aromatic substitution, M3MB and M3MOB, surprisingly exhibited powerful fumigant toxicities against *S. invicta* workers.

The chemical structure of methyl benzoate is similar to the well-known insect repellent N,N-diethyl-3-methylbenzamide (DEET), sharing the same chemical skeleton with exceptions of methyl ester (DEET is diethylamide) and meta methyl substitution. Until today, DEET still remains the gold standard for currently available insect repellent (Misni, N., et al., J. Am. Mosq. Control Assoc., 25: 442-447 (2009)). It does not kill mosquitoes or other biting insects but deters or repels them and has been commonly used in combination with insecticides (Corbel, V., et al., BMC Biol., 10: 86 (2012)). However, the exact mode of action of DEET in target organisms is still a mystery (DeGennaro, M., Fly, 9: 45-51 (2015)), though it is believed to work by jamming the insect olfactory receptors (Davis, E. E., J. Med. Entomol., 22: 237-243 (1985); Khater, H. F., Pharmacologia, 3: 641-656 (2012); Justice, R. W., et al., Bioessays, 25: 1011-1020

(2003)) or masking the smell of the host (Ditzen, M., et al., Science, 319: 1838-1842 (2008)). Our behavior bioassays surprisingly proved that compounds of formula 1 tested possess toxicities and could kill insects at different stages by fumigant and contact actions; however these activities were unpredictable compared to methyl benzoate. Our results also surprisingly showed that toxicities of compounds of formula 1 tested were correlated with alkyl chain length or dimension of alcohol portion of compounds of formula 1 molecules tested as well as being affected by different aromatic substitutions.

All of the references cited herein, including U.S. Patents and U.S. Patent Application Publications, are incorporated by reference in their entirety. Also incorporated by reference in their entirety are the following references: U.S. Pat. Nos. 9,629,362; 8,394,358.

Thus, in view of the above, there is described (in part) the following:

A composition for killing insects, said composition comprising (or consisting essentially of or consisting of) at least one compound of formula 1

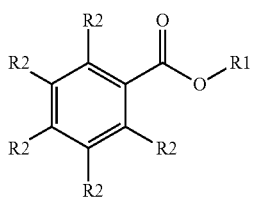

wherein R1 is $CH_3$, $C_2H_5$, $C_3H_7$; saturated or unsaturated, straight or branched, or halogen substituted alkyl; and wherein R2 are independently H, halogen, nitrogen, oxygen, sulfur, saturated or unsaturated, straight or branched alkyl, alkenyl, alkyl halide, aldehyde, ketone, ether, ester, amine, or amide; optionally methyl benzoate, optionally a surfactant, and optionally a carrier.

A method for killing insects, said method comprising treating an object or area with an insect killing effective amount of a composition comprising at least one compound of formula 1

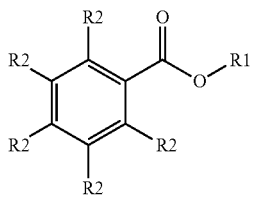

wherein R1 is $CH_3$, $C_2H_5$, $C_3H_7$; saturated or unsaturated, straight or branched, or halogen substituted alkyl; and wherein R2 are independently H, halogen, nitrogen, oxygen, sulfur, saturated or unsaturated, straight or branched alkyl, alkenyl, alkyl halide, aldehyde, ketone, ether, ester, amine, or amide;
optionally methyl benzoate, optionally a surfactant, and optionally a carrier.

A composition which contains EB. A composition which does not contain EB. A composition which contains nPrB. A composition which does not contain nPrB. A composition which contains M2MB. A composition which does not contain M2MB. A composition which contains M2MOB. A composition which does not contain M2MOB. A composition which contains M2CB. A composition which does not contain M2CB. A composition which contains M2NB. A composition which does not contain M2NB. A composition which contains iBB. A composition which does not contain iBB. A composition which contains nBB. A composition which does not contain nBB. A composition which contains nPeB. A composition which does not contain nPeB. A composition which contains VB. A composition which does not contain VB. A composition which contains nHB. A composition which does not contain nHB. A composition which contains M3MB. A composition which does not contain M3MB. A composition which contains M3MOB. A composition which does not contain M3MOB. A composition which contains BB. A composition which does not contain BB. A composition which contains MB. A composition which does not contain MB. A composition where the compound(s) of formula 1 is the sole insecticide.

The term "consisting essentially of" excludes additional method (or process) steps or composition components that substantially interfere with the intended activity of the method (or process) or composition, and can be readily determined by those skilled in the art (for example, from a consideration of this specification or practice of the invention disclosed herein).

The invention illustratively disclosed herein suitably may be practiced in the absence of any element (e.g., method (or process) steps or composition components) which is not specifically disclosed herein. Thus the specification includes disclosure by silence ("Negative Limitations In Patent Claims," AIPLA Quarterly Journal, Tom Brody, 41(1): 46-47 (2013): . . . Written support for a negative limitation may also be argued through the absence of the excluded element in the specification, known as disclosure by silence . . . Silence in the specification may be used to establish written description support for a negative limitation. As an example, in Ex parte Lin [No. 2009-0486, at 2, 6 (B.P.A.I. May 7, 2009)] the negative limitation was added by amendment . . . In other words, the inventor argued an example that passively complied with the requirements of the negative limitation . . . was sufficient to provide support . . . This case shows that written description support for a negative limitation can be found by one or more disclosures of an embodiment that obeys what is required by the negative limitation.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

TABLE 1

Insecticidal activities of MB and some compounds of formula 1 on larvae and pupae developments and adult emergences of *D. suzukii**

| Treatment | Larvae** | Pupae** | Adults** |
|---|---|---|---|
| Control | 6.7 (0.9) | 41.7 (8.7) | 35.7 (7.9) |
| MB | 0 | 0 | 0 |
| EB | 0 | 0 | 0 |
| VB | 0 | 0 | 0 |
| M2MB | 0 | 0 | 0 |
| M2MOB | 0 | 0 | 0 |

TABLE 1-continued

Insecticidal activities of MB and some compounds of formula 1 on larvae and pupae developments and adult emergences of *D. suzukii**

| Treatment | Larvae** | Pupae** | Adults** |
|---|---|---|---|
| M2CB | 0 | 0 | 0 |
| M2NB | 0 | 0 | 0 |
| M3MB | 0 | 0 | 0 |
| M3MOB | 0 | 0 | 0 |
| nPrB | 1.7 (0.3) | 4.0 (0.6) | 3.0 (0.6) |
| nBB | 4.7 (1.2) | 15.0 (2.9) | 25.3 (1.5) |
| iBB | 6.0 (1.5) | 15.7 (1.9) | 24.7 (0.9) |
| nPeB | 5.3 (0.9) | 37.7 (6.7) | 36.3 (3.9) |
| HB | 7.0 (1.0) | 40.3 (7.0) | 33.7 (7.4) |
| BB | 5.7 (0.7) | 40.0 (5.8) | 40.0 (8.4) |

*100 berries pre-infested with 100 mixed-adult for 4 days/treatment, 50 berries were then soaked with 1% MB or other solutions of some compounds of formula 1 and water control respectively for 2 min. Assessment was conducted after 10 days incubation at room temperature.
**Results are means of three replicates; numbers in parenthesis indicate the standard error.

TABLE 2

Nymphicidal effects of MB and some compounds of formula 1 against *H. halys* nymphs*

| Treatment | Stage | $LC_{50}$ (95% CL) μL/vial | Slope ± SE |
|---|---|---|---|
| MB** | $1^{st}$ | 1.03 (0.93-1.10) | 7.69 ± 1.07 |
| MB** | $2^{nd}$ | 1.01 (0.86-1.12) | 6.73 ± 1.11 |
| MB** | $3^{rd}$ | 1.23 (1.12-1.33) | 5.28 ± 0.60 |
| MB** | $4^{th}$ | 2.39 (2.19-2.60) | 6.10 ± 0.72 |
| MB** | $5^{th}$ | 1.77 (1.60-1.93) | 6.00 ± 0.67 |
| EB | $3^{rd}$ | 1.604 (1.468-1.756) | 5.337 ± 0.591 |
| VB | $2^{nd}$ | 1.131 (0.757-1.337) | 6.245 ± 1.155 |
| M2CB | $2^{nd}$ | 1.302 (1.137-1.610) | 5.568 ± 0.849 |
| M2MOB | $2^{nd}$ | 1.530 (1.309-1.951) | 4.393 ± 0.657 |
| M2MB | $2^{nd}$ | 0.974 (0.827-1.109) | 4.165 ± 0.536 |
| M3MOB | $3^{rd}$ | 1.509 (1.322-1.792) | 3.549 ± 0.478 |
| M3MB | $4^{th}$ | 2.433 (2.000-3.417) | 3.606 ± 0.618 |
| nPrB | $3^{rd}$ | 2.591 (2.086-3.839) | 3.427 ± 0.614 |
| nBB | $4^{th}$ | 3.370 (2.441-6.922) | 2.752 ± 0.593 |
| BB | $4^{th}$ | 5.619 (3.028-44.599) | 1.691 ± 0.485 |
| iBB | $3^{rd}$ | 4.890 (2.845-24.779) | 1.821 ± 0.487 |
| M2NB | $3^{rd}$ | n/a | 3.175 ± 0.615 |
| nPeB | $3^{rd}$ | n/a | 1.884 ± 0.809 |
| HB | $5^{th}$ | n/a | 1.679 ± 0.785 |
| AP*** | $2^{nd}$ | 0.257 (0.169-0.340) | 2.078 ± 0.325 |
| AP*** | $3^{rd}$ | 0.475 (0.301-0.641) | 1.750 ± 0.272 |
| AP*** | $5^{th}$ | 1.414 (1.165-1.642) | 3.164 ± 0.394 |
| PF*** | $3^{rd}$ | 1.798 (1.397-2.797) | 3.018 ± 0.450 |
| PF*** | $5^{th}$ | 2.700 (1.881-4.836) | 2.315 ± 0.327 |

*270 nymphs are used for each treatment.
**Data are copied from previous research for comparison purpose only (Feng, Y., and A. Zhang, Sci. Rep., 7: 42168 (2017)).
***AP is acetamiprid (the active ingredient of TriStar 8.5 SL Insecticide), PF is pyriproxyfen (the active ingredient of Insect Growth Regulator).

TABLE 3

Commercially available pesticides tested in laboratory bioassay

| Trademark | Product | Active Ingredient (AI) | C %* |
|---|---|---|---|
| TriStar ® | 8.5 SL Insecticide | Acetamiprid | 8.5% |
| Distance ® | Insect Growth Regulator | Pyriproxyfen | 11.23% |

*Aqueous solution by wt.

TABLE 4

Ovicidal toxicities of MB and some compounds of formula 1 against *H. halys* eggs*

| Treatment | $LC_{50}$ (95% CL) mg/cm$^2$ | $LC_{95}$ (95% CL) mg/cm$^2$ | Slope ± SE |
|---|---|---|---|
| MB | 0.020 (0.012-0.026) | 0.048 (0.036-0.090) | 4.359 ± 1.108 |
| EB | 0.014 (0.010-0.019) | 0.053 (0.036-0.105) | 2.914 ± 0.556 |
| VB | 0.017 (0.010-0.024) | 0.061 (0.042-0.122) | 2.974 ± 0.620 |
| M2CB | 0.011 (0.008-0.013) | 0.030 (0.022-0.059) | 3.724 ± 0.816 |
| M2MOB | 0.011 (0.006-0.015) | 0.030 (0.020-0.111) | 3.724 ± 0.816 |
| M2MB | 0.014 (0.005-0.027) | 0.39 (0.164-2.564) | 1.144 ± 0.247 |
| M2NB | 0.010 (0.002-0.019) | 0.067 (0.033-0.931) | 2.028 ± 0.389 |
| M3MB | 0.016 (0.009-0.024) | 0.097 (0.065-0.184) | 2.128 ± 0.399 |
| M3MOB | 0.016 (0.008-0.026) | 0.083 (0.051-0.189) | 2.327 ± 0.566 |
| nPrB | n/a | n/a | 0.571 ± 0.206 |
| nBB | n/a | n/a | 0.369 ± 0.206 |
| BB | n/a | n/a | 0.016 ± 0.213 |
| iBB | n/a | n/a | 0.016 ± 0.214 |
| nPeB | n/a | n/a | 0.184 ± 0.207 |
| HB | n/a | n/a | 0.033 ± 0.216 |

*270 eggs were used in each bioassay.

TABLE 5

Larvacidal toxicities of MB and some compounds of formula 1 against *L. dispar* larvae*

| Treatment | $LC_{50}$ (95% CL) mg/cm$^2$ | Slope ± SE |
|---|---|---|
| MB | 0.114 (0.091-0.134) | 6.917 ± 0.852 |
| EB | 0.115 (0.107-0.123) | 11.295 ± 1.545 |
| VB | 0.065 (0.059-0.071) | 10.082 ± 1.640 |
| M2MB | 0.155 (0.134-0.174) | 6.671 ± 0.766 |
| M2MOB | 0.230 (0.170-0.294) | 2.971 ± 0.487 |
| M2CB | 0.130 (0.097-0.159) | 7.291 ± 0.868 |
| M3MB | 0.102 (0.083-0.121) | 4.693 ± 0.540 |
| M3MOB | 0.234 (0.216-0.258) | 8.073 ± 1.126 |
| nPrB | 0.159 (0.135-0.199) | 2.576 ± 0.402 |
| nBB | 0.276 (0.223-0.393) | 2.264 ± 0.385 |
| iBB | 0.193 (0.165-0.234) | 2.683 ± 0.386 |
| nPeB | 0.165 (0.118-0.208) | 2.466 ± 0.354 |

TABLE 5-continued

Larvacidal toxicities of MB and some compounds of formula 1 against L. dispar larvae*

| Treatment | LC$_{50}$ (95% CL) mg/cm$^2$ | Slope ± SE |
|---|---|---|
| PF** | 0.086 (0.057-0.124) | 2.429 ± 0.263 |
| AP** | 0.221 (0.167-0.291) | 3.150 ± 0.419 |
| M2NB | n/a | 1.168 ± 0.545 |
| HB | n/a | 2.012 ± 0.843 |
| BB | n/a | 2.858 ± 0.535 |

*30 larvae (1$^{st}$ stage) were used for each bioassay.
**AP is acetamiprid (the active ingredient of TriStar 8.5 SL Insecticide), PF is pyriproxyfen (the active ingredient of Insect Growth Regulator).

TABLE 6

Contact toxicities (LD$_{50}$ values) of MB and some compounds of formula 1 against S. invicta workers

| Benzoate | Colony | LD$_{50}$ (µg/ant) | 95% CL | Slope (mean ± SE) | X$^2$ |
|---|---|---|---|---|---|
| Methylbenzoate | 1 | 149.39 | 130.20-168.11 | 7.01 ± 0.76 | 30.26 |
| (MB) | 2 | 93.65 | 88.85-98.814 | 11.72 ± 1.55 | 6.27 |
|  | 3 | 128.45 | 121.23-136.88 | 9.49 ± 1.13 | 20.23 |
| Ethylbenzoate | 1 | 164.32 | 135.47-207.96 | 3.74 ± 0.65 | 9.91 |
| (EB) | 2 | 129.62 | 120.84-139.11 | 7.60 ± 0.85 | 9.29 |
|  | 3 | 126.53 | 118.73-134.75 | 7.13 ± 0.81 | 11.1 |
| Methyl-2-methoxybenzoate | 1 | 67.73 | 65.03-70.22 | 24.94 ± 3.96 | 3.27 |
| (M2MOB) | 2 | 96.43 | 90.63-103.99 | 8.43 ± 1.17 | 13.15 |
|  | 3 | 78.34 | 72.11-84.54 | 7.1 9 ± 0.88 | 16.05 |
| n-Propylbenzoate | 1 | 109.89 | 101.48-124.46 | 7.104 ± 1.26 | 7.52 |
| (nPRB) | 2 | 109.26 | 100.98-125.21 | 11.39 ± 2.47 | 21.23 |
| n-Buthylbenzoate | 1 | 77.13 | 72.80-82.23 | 10.31 ± 1.33 | 14.23 |
| (nBB) | 2 | 68.51 | 63.33-76.01 | 6.34 ± 1.00 | 5.61 |
|  | 3 | 50.04 | 40.54-57.83 | 4.73 ± 0.54 | 40.52 |
| n-Pentybenzoate | 1 | 35.97 | 32.93-38.70 | 8.60 ± 1.17 | 7.44 |
| (nPEB) | 2 | 41.16 | 37.80-44.34 | 11.66 ± 1.42 | 17.5 |
|  | 3 | 28.64 | 25.80-31.41 | 6.15 ± 0.68 | 10.77 |
| iso-Butylbenzoate | 1 | 80.07 | 74.30-86.15 | 7.06 ± 0.86 | 13.77 |
| (IBB) | 2 | 96.57 | 85.67-116.11 | 7.34 ± 1.00 | 39.34 |
|  | 3 | 55.75 | 51.11-59.96 | 9.11 ± 1.01 | 15.09 |
| n-Hexylbenzoate | 1 | 37.1 | 32.98-41.00 | 5.54 ± 0.62 | 13.15 |
| (nHB) | 2 | 42.23 | 39.30-45.01 | 9.14 ± 0.1.10 | 3.55 |
|  | 3 | 28.64 | 25.80-31.41 | 6.15 ± 0.68 | 10.77 |
| Benzylbenzoate | 1 | 25.44 | 22.21-28.46 | 4.72 ± 0.52 | 10.48 |
| (BB) | 2 | 25.68 | 21.48-29.46 | 4.15 ± 0.51 | 5.81 |
|  | 3 | 18.83 | 16.44-21.09 | 5.75 ± 0.79 | 5.26 |
| Methyl-3-methylbenzoate | 1 | 70.32 | 62.00-77.63 | 8.40 ± 0.95 | 32.1 |
| (M3MB) | 2 | 107.48 | 93.37-142.99 | 5.65 ± 0.87 | 28.72 |
|  | 3 | 67.73 | 65.03-70.22 | 24.93 ± 3.96 | 3.27 |
| Methyl-3-methoxybenzoate | 1 | 112.72 | 99.69-143.06 | 5.69 ± 0.93 | 20.35 |
| (M3MOB) | 2 | 81.78 | 74.69-88.14 | 7.73 ± 1.22 | 13.38 |
|  | 3 | 47.52 | 41.99-52.18 | 7.33 ± 0.88 | 15.32 |
| Methylbenzoate | 1 | 149.39 | 130.20-168.11 | 7.01 ± 0.76 | 30.26 |
| (MB) | 2 | 93.65 | 88.85-98.814 | 11.72 ± 1.55 | 6.27 |
|  | 3 | 128.45 | 121.23-136.88 | 9.49 ± 1.13 | 20.23 |
| Methyl-2-methoxybenzoate | 1 | 67.73 | 65.03-70.22 | 24.94 ± 3.96 | 3.27 |
| (M2MOB) | 2 | 96.43 | 90.63-103.99 | 8.43 ± 1.17 | 13.15 |
|  | 3 | 78.34 | 72.11-84.54 | 7.1 9 ± 0.88 | 16.05 |
| n-Propylbenzoate | 1 | 109.89 | 101.48-124.46 | 7.104 ± 1.26 | 7.52 |
| (nPrB) | 2 | 109.26 | 100.98-125.21 | 11.39 ± 2.47 | 21.23 |
| n-Buthylbenzoate | 1 | 77.13 | 72.80-82.23 | 10.31 ± 1.33 | 14.23 |
| (nBB) | 2 | 68.51 | 63.33-76.01 | 6.34 ± 1.00 | 5.61 |
|  | 3 | 50.04 | 40.54-57.83 | 4.73 ± 0.54 | 40.52 |
| n-Pentybenzoate | 1 | 35.97 | 32.93-38.70 | 8.60 ± 1.17 | 7.44 |
| (nPeB) | 2 | 41.16 | 37.80-44.34 | 11.66 ± 1.42 | 17.5 |
|  | 3 | 28.64 | 25.80-31.41 | 6.15 ± 0.68 | 10.77 |
| iso-Butylbenzoate | 1 | 80.07 | 74.30-86.15 | 7.06 ± 0.86 | 13.77 |
| (iBB) | 2 | 96.57 | 85.67-116.11 | 7.34 ± 1.00 | 39.34 |
|  | 3 | 55.75 | 51.11-59.96 | 9.11 ± 1.01 | 15.09 |
| n-Hexylbenzoate | 1 | 37.1 | 32.98-41.00 | 5.54 ± 0.62 | 13.15 |
| (nHB) | 2 | 42.23 | 39.30-45.01 | 9.14 ± 0.1.10 | 3.55 |
|  | 3 | 28.64 | 25.80-31.41 | 6.15 ± 0.68 | 10.77 |
| Benzylbenzoate | 1 | 25.44 | 22.21-28.46 | 4.72 ± 0.52 | 10.48 |
| (BB) | 2 | 25.68 | 21.48-29.46 | 4.15 ± 0.51 | 5.81 |
|  | 3 | 18.83 | 16.44-21.09 | 5.75 ± 0.79 | 5.26 |
| Methyl-3-methylbenzoate | 1 | 70.32 | 62.00-77.63 | 8.40 ± 0.95 | 32.1 |
| (M3MB) | 2 | 107.48 | 93.37-142.99 | 5.65 ± 0.87 | 28.72 |
|  | 3 | 67.73 | 65.03-70.22 | 24.93 ± 3.96 | 3.27 |

TABLE 6-continued

Contact toxicities (LD$_{50}$ values) of MB and some compounds of formula 1 against *S. invicta* workers

| Benzoate | Colony | LD$_{50}$ (µg/ant) | 95% CL | Slope (mean ± SE) | X$^2$ |
|---|---|---|---|---|---|
| Methyl-3-methoxybenzoate (M3MOB) | 1 | 112.72 | 99.69-143.06 | 5.69 ± 0.93 | 20.35 |
| | 2 | 81.78 | 74.69-88.14 | 7.73 ± 1.22 | 13.38 |
| | 3 | 47.52 | 41.99-52.18 | 7.33 ± 0.88 | 15.32 |

TABLE 7

Fumigant toxicities (LC$_{50}$ values) of MB and some compounds of formula 1 against *S. invicta* workers

| Benzoate | Colony | LC$_{50}$ (µg/mL) | 95% CL | Slope (mean ± SE) | X$^2$ |
|---|---|---|---|---|---|
| Methyl benzoate (MB) | 1 | 0.77 | 0.73-0.81 | 9.14 ± 0.94 | 13.48 |
| (MB) | 2 | 0.66 | 0.62-0.69 | 11.12 ± 1.35 | 11.82 |
| (MB) | 3 | 0.82 | 0.69-0.88 | 12.11 ± 2.30 | 25.32 |
| Vinyl benzoate (VB) | 1 | 0.95 | 0.89-1.03 | 9.46 ± 0.87 | 23.34 |
| | 2 | 0.77 | 0.74-0.80 | 25.99 ± 2.39 | 3.08 |
| | 3 | 0.96 | 0.92-0.10 | 16.07 ± 2.18 | 9.67 |
| Methyl-2-chlorobenzoate (M2CB) | 1 | 0.89 | 0.77-1.01 | 6.35 ± 0.71 | 21.28 |
| | 2 | 0.77 | 0.77-0.83 | 4.62 ± 0.50 | 11.33 |
| | 3 | 0.56 | 0.51-0.60 | 7.24 ± 0.68 | 5.95 |
| Methyl-3-methylbenzoate (M3MB) | 1 | 0.62 | 0.58-0.65 | 7.55 ± 0.73 | 10.17 |
| | 2 | 0.7 | 0.62-0.78 | 10.52 ± 1.09 | 60.97 |
| | 3 | 0.63 | 0.55-0.69 | 9.72 ± 0.96 | 49.81 |
| Methyl-3-methoxybenzoate (M3MOB) | 1 | 0.64 | 0.52-0.73 | 6.25 ± 0.84 | 28.57 |
| | 2 | 0.54 | 0.43-0.63 | 5.24 ± 0.56 | 29.51 |
| | 3 | 0.65 | 0.58-0.71 | 5.03 ± 0.51 | 14.77 |
| Ethyl benzoate (EB) | 1 | 0.89 | 0.85-0.93 | 14.21 ± 1.39 | 18.08 |
| | 2 | 0.76 | 0.70-0.81 | 9.81 ± 1.24 | 15.34 |
| | 3 | 1.14 | 1.02-1.21 | 13.82 ± 2.01 | 30.70 |

We claim:

1. A composition for killing insects comprising an effective amount of a mixture comprising
   a) vinyl benzoate,
   b) at least one compound of formula I:

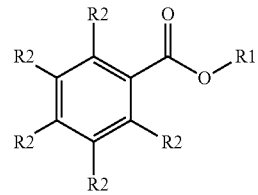

wherein R1 is CH$_3$, C$_2$H$_5$, C$_3$H$_7$, a saturated or unsaturated, straight or branched, or halogen substituted alkyl; and
   R2 is independently H, halogen, nitrogen, oxygen, sulfur, a saturated or unsaturated, straight or branched alkyl, alkenyl, alkyl halide, aldehyde, ketone, ether, ester, amine, or amide
   and
   c) a carrier, wherein the effective amount is effective for killing insects.

2. The composition of claim 1, wherein the at least one compound of formula I is selected from the group consisting of methyl benzoate and benzyl benzoate.

* * * * *